(12) United States Patent
Komada et al.

(10) Patent No.: US 10,589,818 B2
(45) Date of Patent: Mar. 17, 2020

(54) BICYCLE OPERATING DEVICE

(71) Applicant: SHIMANO INC., Sakai (JP)

(72) Inventors: Yasuyuki Komada, Sakai (JP); Kohei Ohyabu, Sakai (JP); Shouichi Ono, Sakai (JP)

(73) Assignee: SHIMANO INC., Sakai (JP)

(*) Notice: Subject to any disclaimer, the term of this patent is extended or adjusted under 35 U.S.C. 154(b) by 147 days.

(21) Appl. No.: 15/415,778

(22) Filed: Jan. 25, 2017

(65) Prior Publication Data
US 2018/0208266 A1    Jul. 26, 2018

(51) Int. Cl.
*B62K 23/06* (2006.01)
*B62L 3/02* (2006.01)
*B62M 25/04* (2006.01)
*B62M 25/08* (2006.01)

(52) U.S. Cl.
CPC ............. *B62K 23/06* (2013.01); *B62L 3/023* (2013.01); *B62M 25/04* (2013.01); *B62M 25/08* (2013.01)

(58) Field of Classification Search
CPC ........ B62K 23/06; B62L 3/023; B62M 25/04; B62M 25/045; B62M 25/08
See application file for complete search history.

(56) References Cited

U.S. PATENT DOCUMENTS

| | | | | |
|---|---|---|---|---|
| 4,319,673 A * | 3/1982 | Kojima | ...................... | B62L 3/02 192/217 |
| 5,575,178 A * | 11/1996 | Wu | .......................... | B62L 3/02 74/489 |
| 8,297,143 B2 * | 10/2012 | Fujii | ....................... | B62K 23/02 200/61.88 |
| 2004/0069090 A1 * | 4/2004 | Iteya | ....................... | B62M 25/08 74/551.8 |
| 2005/0016312 A1 * | 1/2005 | Dal Pra' | ................. | B62K 23/06 74/484 R |
| 2006/0086588 A1 * | 4/2006 | Tsumiyama | ............. | B62L 3/023 192/217 |
| 2009/0188340 A1 * | 7/2009 | Tetsuka | ................... | B62K 23/02 74/473.13 |
| 2010/0083786 A1 * | 4/2010 | Miki | ....................... | B62K 21/26 74/489 |
| 2011/0011197 A1 | 1/2011 | Oku et al. | | |
| 2013/0255239 A1 * | 10/2013 | Miki | ........................ | B62L 3/023 60/325 |
| 2013/0276568 A1 * | 10/2013 | Burato | ................... | F16H 59/044 74/473.12 |
| 2015/0291247 A1 | 10/2015 | Fukao | | |

FOREIGN PATENT DOCUMENTS

| | | |
|---|---|---|
| CN | 101492089 | 7/2009 |
| CN | 103373427 | 10/2013 |
| CN | 105836027 | 8/2016 |
| DE | 102015004502 | 10/2015 |
| DE | 102015010839 | 8/2016 |

* cited by examiner

*Primary Examiner* — Thomas C Diaz

(74) *Attorney, Agent, or Firm* — Mori & Ward, LLP

(57) ABSTRACT

A bicycle operating device comprises a base member and an operating member. The base member is configured to be mounted to a bicycle handlebar. The operating member is movably coupled to the base member. The base member includes a first arrangement part to which at least one of a first operating structure and a first cover structure is arrangeable. The base member includes a second arrangement part to which at least one of a second operating structure and a second cover structure is arrangeable.

26 Claims, 36 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member and an operating member. The base member is configured to be mounted to a bicycle handlebar. The operating member is movably coupled to the base member. The base member includes a first arrangement part to which at least one of a first operating structure and a first cover structure is arrangeable. The base member includes a second arrangement part to which at least one of a second operating structure and a second cover structure is arrangeable.

With the bicycle operating device according to the first aspect, the first arrangement part and the second arrangement part improve convenience of the bicycle operating device since at least one of the first operating structure and the first cover structure is arrangeable to the first arrangement part and at least one of the second operating structure and the second cover structure is arrangeable to the second arrangement part.

In accordance with a second aspect of the present invention, the bicycle operating device according to the first aspect is configured so that the first arrangement part at least partly faces in a first direction. The second arrangement part at least partly faces in a second direction opposite to the first direction.

With the bicycle operating device according to the second aspect, it is possible to utilize respective areas adjacent to the first arrangement part and the second arrangement part with reducing interference between the at least one of the first operating structure and the first cover structure and at least one of the second operating structure and the second cover structure.

In accordance with a third aspect of the present invention, the bicycle operating device according to the second aspect is configured so that the operating member is pivotally coupled to the base member about a pivot axis. The first direction and the second direction are parallel to the pivot axis.

With the bicycle operating device according to the third aspect, it is possible to effectively utilize the respective areas adjacent to the first arrangement part and the second arrangement part with reducing interference between the at least one of the first operating structure and the first cover structure and at least one of the second operating structure and the second cover structure.

In accordance with a fourth aspect of the present invention, the bicycle operating device according to any one of the first to third aspects is configured so that the operating member is pivotally coupled to the base member about a pivot axis. The base member has a maximum axial width and a base center plane. The maximum axial width is defined in an axial direction of the pivot axis. The base center plane is defined to bisect the maximum axial width and perpendicular to the pivot axis. The base center plane is provided between the first arrangement part and the second arrangement part in the axial direction.

With the bicycle operating device according to the fourth aspect, it is possible to utilize respective areas adjacent to the first arrangement part and the second arrangement part with reducing interference between the at least one of the first operating structure and the first cover structure and at least one of the second operating structure and the second cover structure.

In accordance with a fifth aspect of the present invention, the bicycle operating device according to any one of the first to fourth aspects is configured so that the first arrangement part includes a first arrangement surface contactable with the first operating structure. The second arrangement part includes a second arrangement surface contactable with the second operating structure.

With the bicycle operating device according to the fifth aspect, the first arrangement surface and the second arrangement surface respectively stabilize positions of the first operating structure and the second operating structure relative to the base member.

In accordance with a sixth aspect of the present invention, the bicycle operating device according to the fifth aspect is configured so that the first arrangement surface faces in a first direction. The second arrangement surface faces in a second direction opposite to the first direction.

With the bicycle operating device according to the sixth aspect, it is possible to utilize respective areas adjacent to the first arrangement surface and the second arrangement surface with reducing interference between the at least one of the first operating structure and the first cover structure and at least one of the second operating structure and the second cover structure.

In accordance with a seventh aspect of the present invention, the bicycle operating device according to any one of the first to sixth aspects is configured so that the first arrangement part includes a first attachment portion to which the first cover structure is attachable.

With the bicycle operating device according to the seventh aspect, it is possible to attach the first cover structure to the first arrangement part with the first attachment portion.

In accordance with an eighth aspect of the present invention, the bicycle operating device according to any one of the first to seventh aspects is configured so that the second arrangement part includes a second attachment portion to which the second cover structure is attachable.

With the bicycle operating device according to the eighth aspect, it is possible to attach the second cover structure to the second arrangement part with the second attachment portion.

In accordance with a ninth aspect of the present invention, the bicycle operating device according to any one of the first to eighth aspects further comprises an electrical switch provided as the first operating structure and the second operating structure which are identical to each other. The electrical switch is selectively arrangeable to one of the first arrangement part and the second arrangement part.

With the bicycle operating device according to the ninth aspect, it is possible to operate an electrical bicycle component with the electrical switch.

In accordance with a tenth aspect of the present invention, the bicycle operating device according to any one of the first to eighth aspects further comprises the first operating structure and the second operating structure. The first operating structure includes a first electrical switch arrangeable to the first arrangement part. The second operating structure includes a second electrical switch arrangeable to the second arrangement part and different from the first electrical switch.

With the bicycle operating device according to the tenth aspect, it is possible to operate an electrical bicycle component with at least one of the first electrical switch and the second electrical switch.

In accordance with an eleventh aspect of the present invention, the bicycle operating device according to any one of the first to tenth aspects further comprises a wireless communicator. At least one of the first operating structure and the second operating structure are electrically connected to the wireless communicator to transmit a wireless signal based on a user input with respect to the at least one of the first operating structure and the second operating structure.

With the bicycle operating device according to the eleventh aspect, it is possible to wirelessly operate an electrical bicycle component with the at least one of the first operating structure and the second operating structure.

In accordance with a twelfth aspect of the present invention, the bicycle operating device according to any one of the first to eleventh aspects further comprises the first cover structure. The first cover structure includes at least one of a first cover selectively arrangeable to the first arrangement part and a second cover selectively arrangeable to the first arrangement part, the second cover having a shape different from a shape of the first cover.

With the bicycle operating device according to the twelfth aspect, it is possible to further improve convenience of the bicycle operating device.

In accordance with a thirteenth aspect of the present invention, the bicycle operating device according to the twelfth aspect is configured so that the first cover includes a first facing part spaced apart from the first arrangement part to define a first space in which the first operating structure is arrangeable in a first state where the first cover is arranged to the first arrangement part.

With the bicycle operating device according to the thirteenth aspect, the first facing part allows the user to operate the first operating structure in the first state where the first cover is arranged to the first arrangement part.

In accordance with a fourteenth aspect of the present invention, the bicycle operating device according to the thirteenth aspect is configured so that the first cover includes a first access portion from which the first operating structure is operated in the first state.

With the bicycle operating device according to the fourteenth aspect, the first access portion allows the user to operate the first operating structure in the first state.

In accordance with a fifteenth aspect of the present invention, the bicycle operating device according to the fourteenth aspect is configured so that the first access portion includes a first elastic member contactable with the first operating structure in the first state.

With the bicycle operating device according to the fifteenth aspect, the first elastic member allows the user to operate the first operating structure with comfortable feeling in the first state.

In accordance with a sixteenth aspect of the present invention, the bicycle operating device according to any one of the first to fifteenth aspects further comprises the second cover structure. The second cover structure includes at least one of a third cover selectively arrangeable to the second arrangement part and a fourth cover selectively arrangeable to the second arrangement part, the fourth cover having a shape different from a shape of the third cover.

With the bicycle operating device according to the sixteenth aspect, it is possible to further improve convenience of the bicycle operating device.

In accordance with a seventeenth aspect of the present invention, the bicycle operating device according to the sixteenth aspect is configured so that the third cover includes a second facing part spaced apart from the second arrangement part to define a second space in which the second operating structure is arrangeable in a second state where the third cover is arranged to the second arrangement part.

With the bicycle operating device according to the seventeenth aspect, the second facing part allows the user to operate the second operating structure in the second state where the third cover is arranged to the second arrangement part.

In accordance with an eighteenth aspect of the present invention, the bicycle operating device according to the seventeenth aspect is configured so that the third cover includes a second access portion from which the second operating structure is operated in the second state.

With the bicycle operating device according to the eighteenth aspect, the second access portion allows the user to operate the second operating structure in the second state where the third cover is arranged to the second arrangement part.

In accordance with a nineteenth aspect of the present invention, the bicycle operating device according to the eighteenth aspect is configured so that the second access portion includes a second elastic member contactable with the second operating structure in the second state.

With the bicycle operating device according to the nineteenth aspect, the second elastic member allows the user to operate the second operating structure with comfortable feeling in the second state.

In accordance with a twentieth aspect of the present invention, the bicycle operating device according to any one of the first to nineteenth aspects is configured so that the base member includes a bar-end contact surface configured to contact an end surface of a bar end of the bicycle handlebar in a mounting state where the base member is mounted to the bicycle handlebar.

With the bicycle operating device according to the twentieth aspect, the bar-end contact surface positions the base member relative to the bar end of the bicycle handlebar in the mounting state.

In accordance with a twenty-first aspect of the present invention, the bicycle operating device according to any one of the first to twentieth aspects is configured so that the base member includes a cylinder bore provided between the first arrangement part and the second arrangement part.

With the bicycle operating device according to the twenty-first aspect, it is possible to operate a hydraulic bicycle component.

In accordance with a twenty-second aspect of the present invention, the bicycle operating device according to the twenty-first aspect is configured so that the base member includes a reservoir bore configured to be fluidly connected to the cylinder bore. The reservoir bore is provided between the first arrangement part and the second arrangement part.

With the bicycle operating device according to the twenty-second aspect, it is possible to absorb volume change of hydraulic fluid provided in the cylinder bore due to change in usage environment.

In accordance with a twenty-third aspect of the present invention, the bicycle operating device according to the ninth aspect is configured so that the electrical switch has a symmetrical shape with respect to a longitudinal center plane of the electrical switch.

With the bicycle operating device according to the twenty-third aspect, it is possible to further improve convenience of the bicycle operating device.

In accordance with a twenty-fourth aspect of the present invention, the bicycle operating device according to the fourth aspect is configured so that the first arrangement part is symmetrical to the second arrangement part with respect to the base center plane.

With the bicycle operating device according to the twenty-fourth aspect, it is possible to further improve convenience of the bicycle operating device.

In accordance with a twenty-fifth aspect of the present invention, the bicycle operating device according to the fourth aspect is configured so that the operating member is symmetrical with respect to the base center plane.

With the bicycle operating device according to the twenty-fifth aspect, it is possible to further improve convenience of the bicycle operating device.

In accordance with a twenty-sixth aspect of the present invention, the bicycle operating device according to the fourth aspect is configured so that the base member includes a first cable guide groove and a second cable guide groove. The base center plane is provided between the first cable guide groove and the second cable guide groove.

With the bicycle operating device according to the twenty-sixth aspect, the first cable guide groove and the second cable guide groove further improve convenience of the bicycle operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
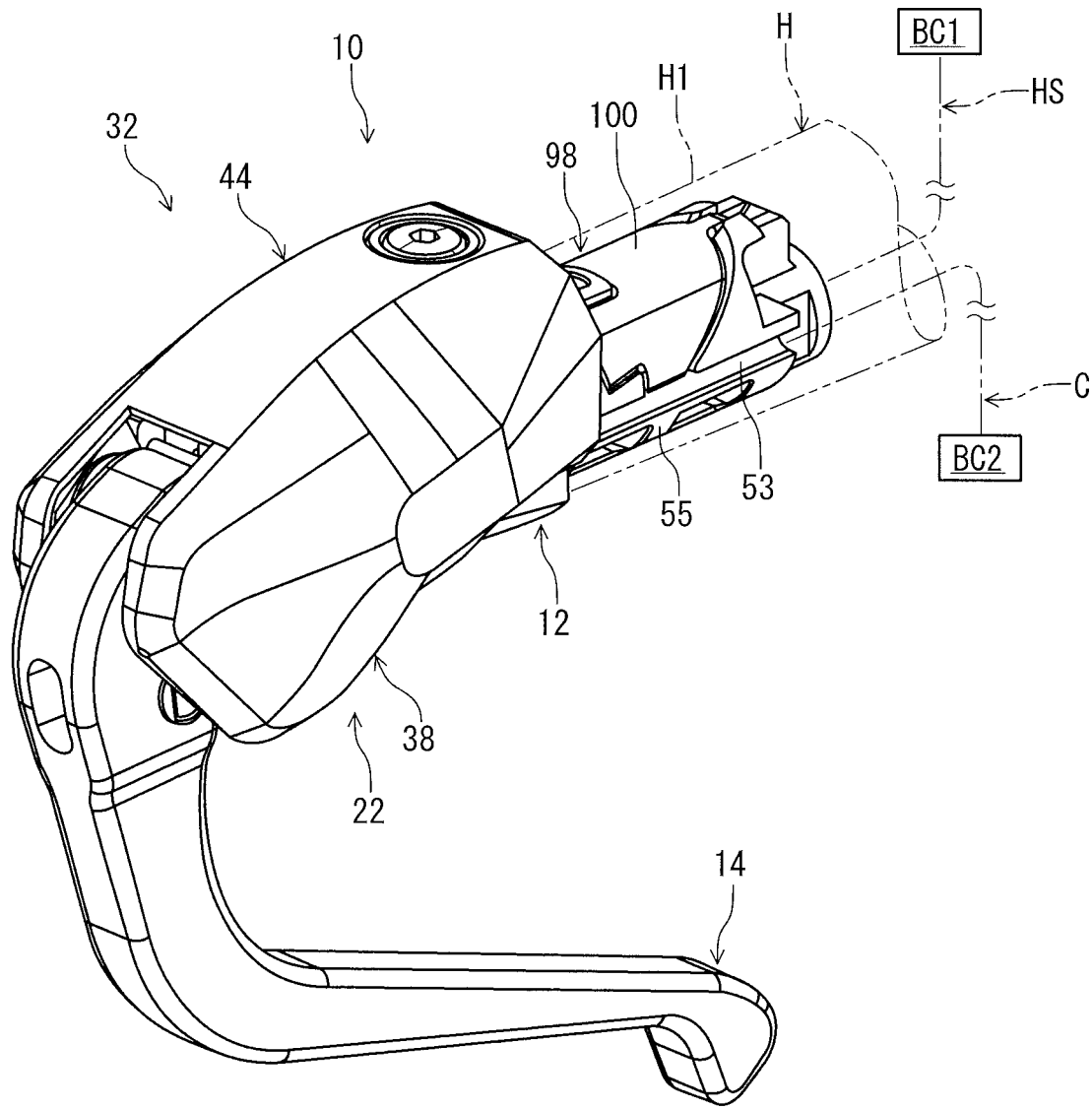
FIG. 1 is a perspective view of a bicycle operating device in accordance with a first embodiment (first state).

The embodiment(s) will now be described with reference to the accompanying drawings, wherein like reference numerals designate corresponding or identical elements throughout the various drawings.

First Embodiment

Figure 2:
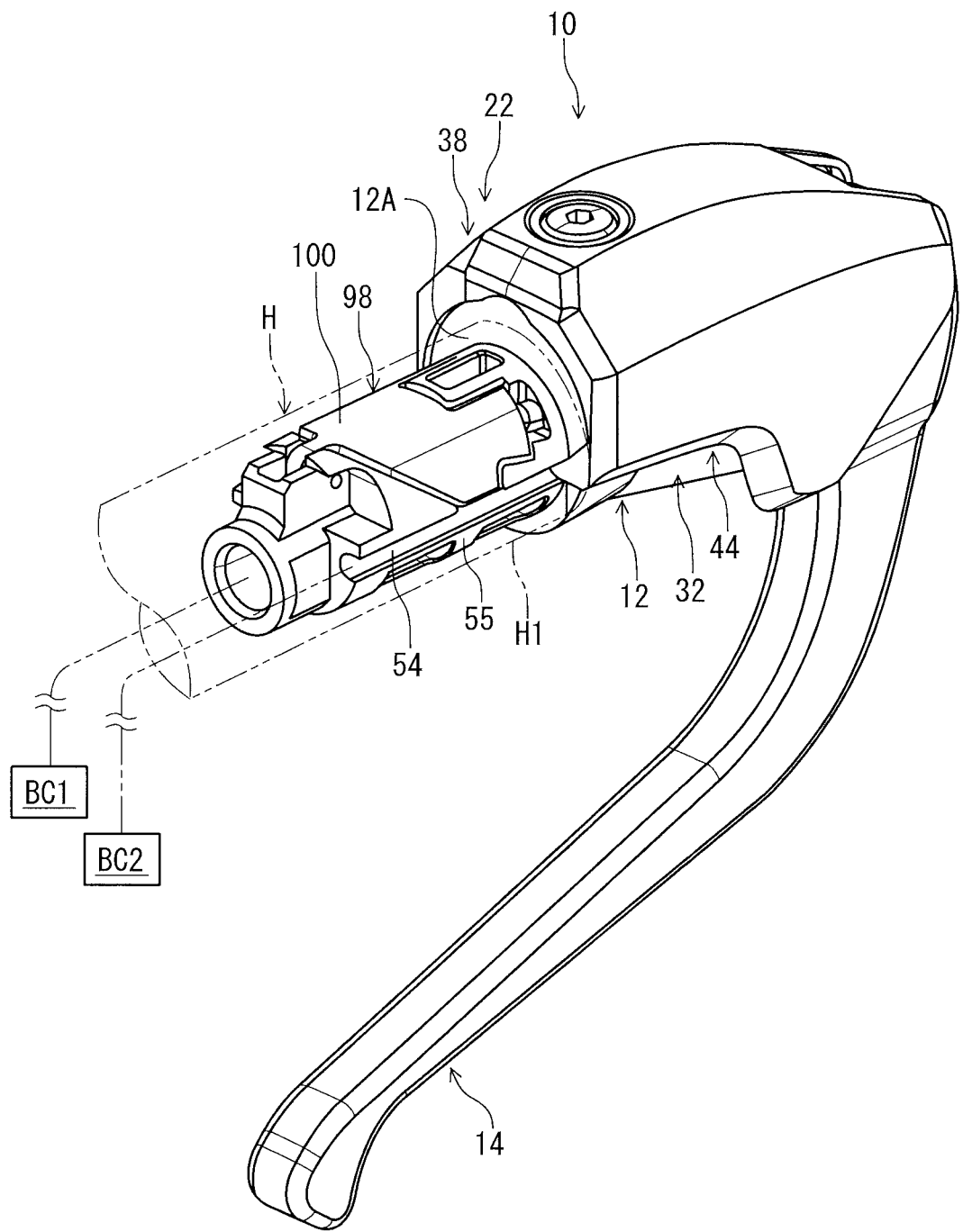
FIG. 2 is another perspective view of the bicycle operating device illustrated in FIG. 1 (first state).

Referring initially to FIGS. 1 and 2, a bicycle operating device 10 in accordance with an embodiment is configured to be mounted to a bicycle handlebar H such as a time trial handlebar, a bull horn handlebar, and a flat handlebar. However, the bicycle operating device 10 can be mounted to other type of handlebars if needed and/or desired.

The bicycle operating device 10 is configured to be operated by a user (e.g., a rider) to actuate a bicycle component BC1 such as a hydraulic brake device. The bicycle operating device 10 is connected to the bicycle component BC1 via a hydraulic hose HS. In the illustrated embodiment, the bicycle operating device 10 is a right-hand side control device configured to be operated by the rider's right hand to actuate the bicycle component BC1. However, the construction of the bicycle operating device 10 can be applied to a left-hand side control device if needed and/or desired. Specifically, the base member 12 can be used as the left-hand side control device.

In the present application, the following directional terms "front," "rear," "forward," "rearward," "left," "right," "transverse," "upward" and "downward" as well as any other similar directional terms refer to those directions which are determined on the basis of the user (e.g., the rider) who sits on a saddle (not shown) of a bicycle with facing the bicycle handlebar H. Accordingly, these terms, as utilized to describe the bicycle operating device 10, should be interpreted relative to the bicycle equipped with the bicycle operating device 10 as used in an upright riding position on a horizontal surface.

Figure 3:
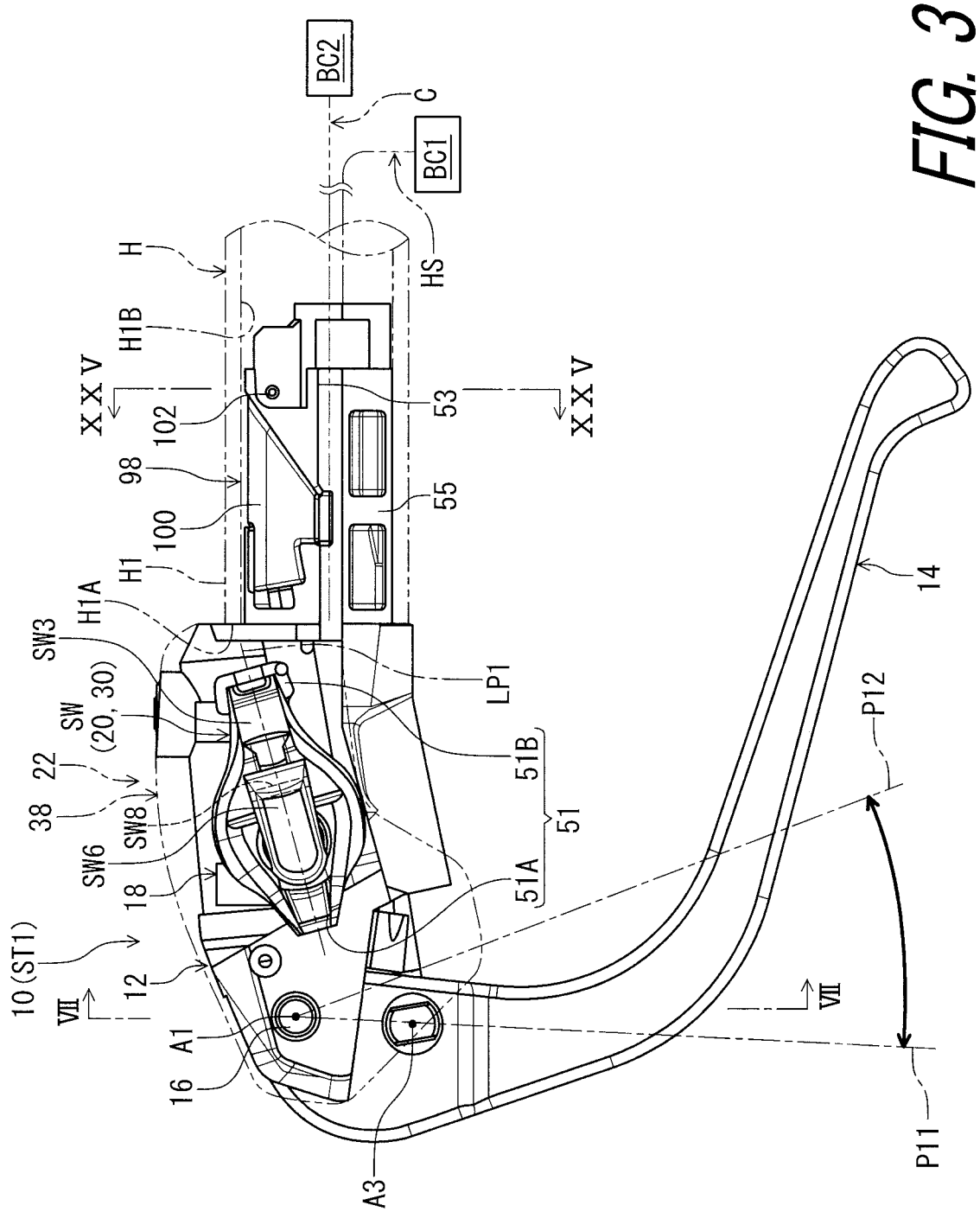
FIG. 3 is a side elevational view of the bicycle operating device illustrated in FIG. 1 (first state).
Figure 4:
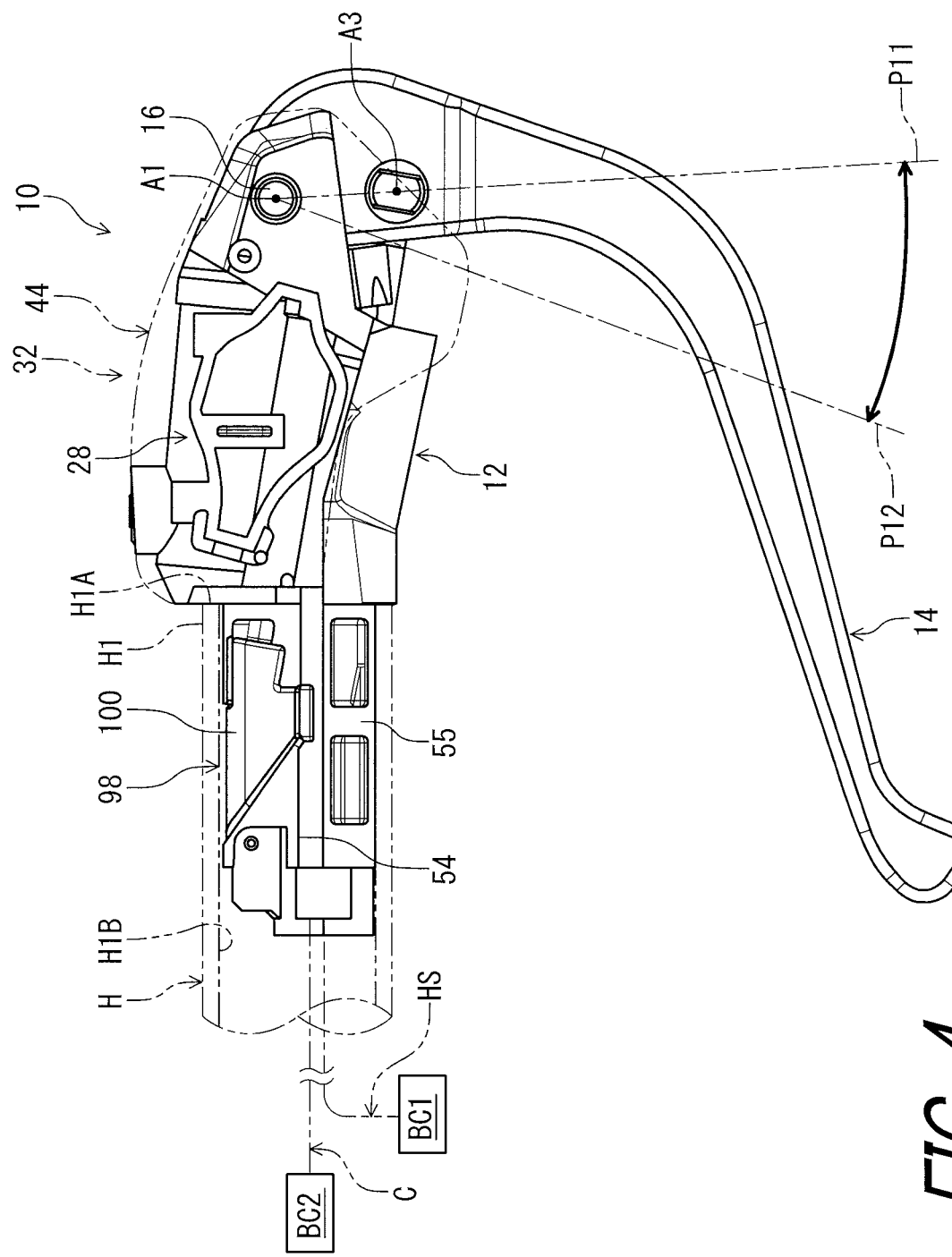
FIG. 4 is another side elevational view of the bicycle operating device illustrated in FIG. 1 (first state).

As seen in FIGS. 3 and 4, the bicycle operating device 10 comprises a base member 12 and an operating member 14. The base member 12 is configured to be mounted to the bicycle handlebar H. In this embodiment, the base member 12 is configured to be mounted to a bar end H1 of the bicycle handlebar H. The base member 12 includes a bar-end contact surface 12A (FIG. 2) configured to contact an end surface H1A of the bar end H1 of the bicycle handlebar H in a mounting state where the base member 12 is mounted to the bicycle handlebar H. However, the bar-end contact surface 12A can be omitted from the base member 12.

The operating member 14 is movably coupled to the base member 12. The operating member 14 is pivotally coupled to the base member 12 about a pivot axis A1. The operating member 14 is pivotally coupled to the base member 12 to operate the bicycle component BC1. The bicycle operating device 10 comprises a pivot pin 16 defining the pivot axis A1. The pivot pin 16 pivotally couples the operating member 14 to the base member 12 about the pivot axis A1. The operating member 14 is pivotable relative to the base member 12 about the pivot axis A1 between a rest position P11 and an operated position P12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a bicycle component such as the bicycle component BC1.

Figure 5:
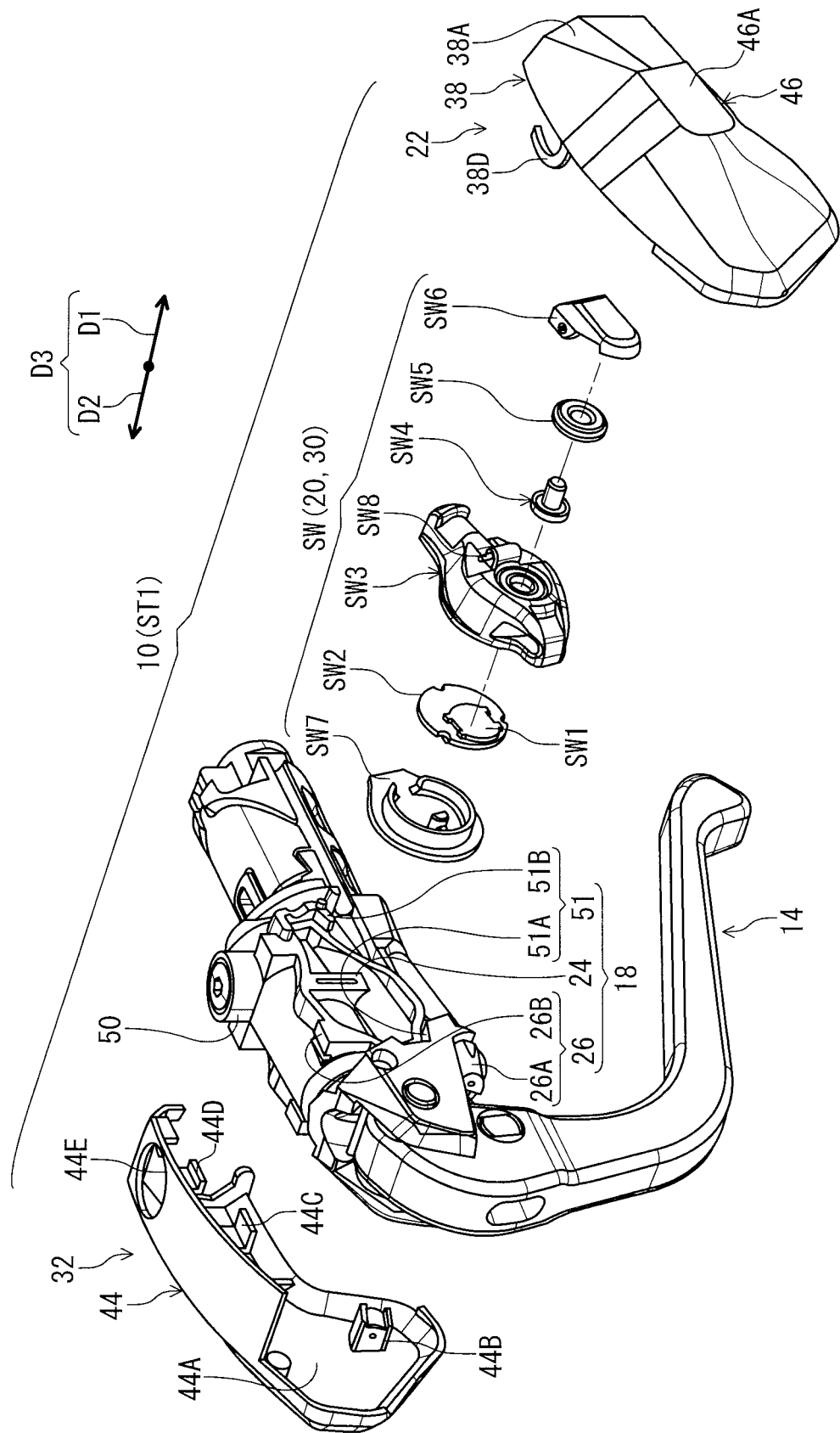
FIG. 5 is an exploded perspective view of the bicycle operating device illustrated in FIG. 1 (first state).

As seen in FIG. 5, the base member 12 includes a first arrangement part 18 to which at least one of a first operating structure 20 and a first cover structure 22 is arrangeable. In this embodiment, the first operating structure 20 and the first cover structure 22 are arranged to the first arrangement part 18. The first arrangement part 18 at least partly faces in a first direction D1. The first arrangement part 18 includes a first arrangement surface 24 contactable with the first operating structure 20. The first arrangement surface 24 faces in the first direction D1. The first arrangement part 18 includes a first attachment portion 26 to which the first cover structure 22 is attachable.

Figure 6:
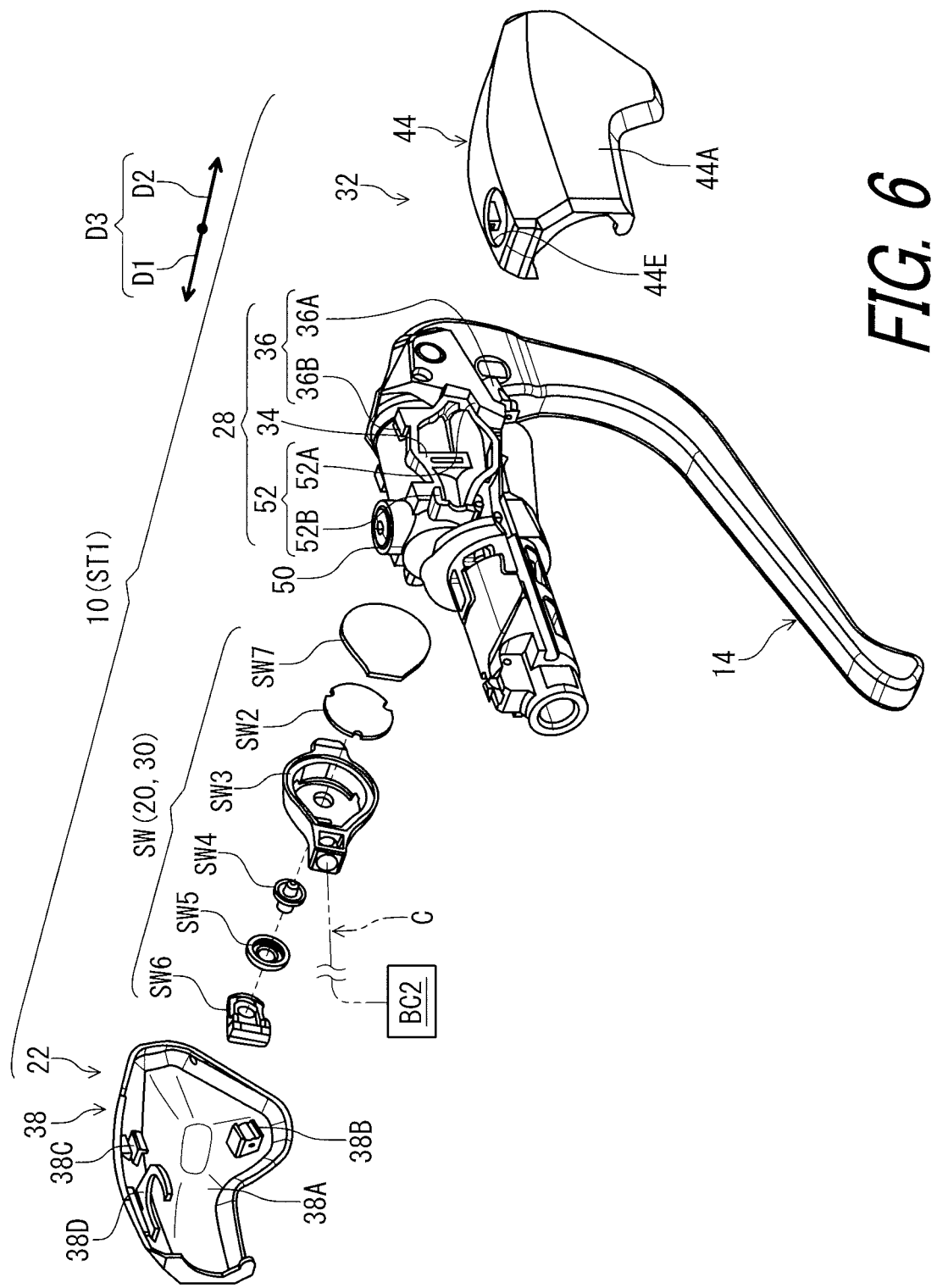
FIG. 6 is another exploded perspective view of the bicycle operating device illustrated in FIG. 1 (first state).

As seen in FIG. 6, the base member 12 includes a second arrangement part 28 to which at least one of a second operating structure 30 and a second cover structure 32 is arrangeable. In this embodiment, the second operating structure 30 is identical to the first operating structure 20. In the bicycle operating device 10 depicted in the FIGS. 5 and 6, the first operating structure 20 and the first cover structure are arranged to the first arrangement part 18, while only the second cover structure 32 is arranged to the second arrangement part 28. The second arrangement part 28 at least partly faces in a second direction D2 opposite to the first direction D1. The second arrangement part 28 includes a second arrangement surface 34 contactable with the second operating structure 30. The second arrangement surface 34 faces in the second direction D2 opposite to the first direction D1. The second arrangement part 28 includes a second attachment portion 36 to which the second cover structure 32 is attachable. The first direction D1 and the second direction D2 are parallel to the pivot axis A1 (FIG. 4).

As seen in FIGS. 5 and 6, the bicycle operating device 10 further comprises an electrical switch SW provided as the first operating structure 20 and the second operating structure 30 which are identical to each other. Namely, the electrical switch SW is shared between a first state ST1 (described later) and a second state ST2 (described later) in the bicycle operating device 10. The electrical switch SW is configured to receive a user input to operate the additional bicycle component BC2. In this embodiment, the electrical switch SW includes an electrical pushbutton switch such as a normally open switch. However, the electrical switch SW can have another configuration.

Figure 7:
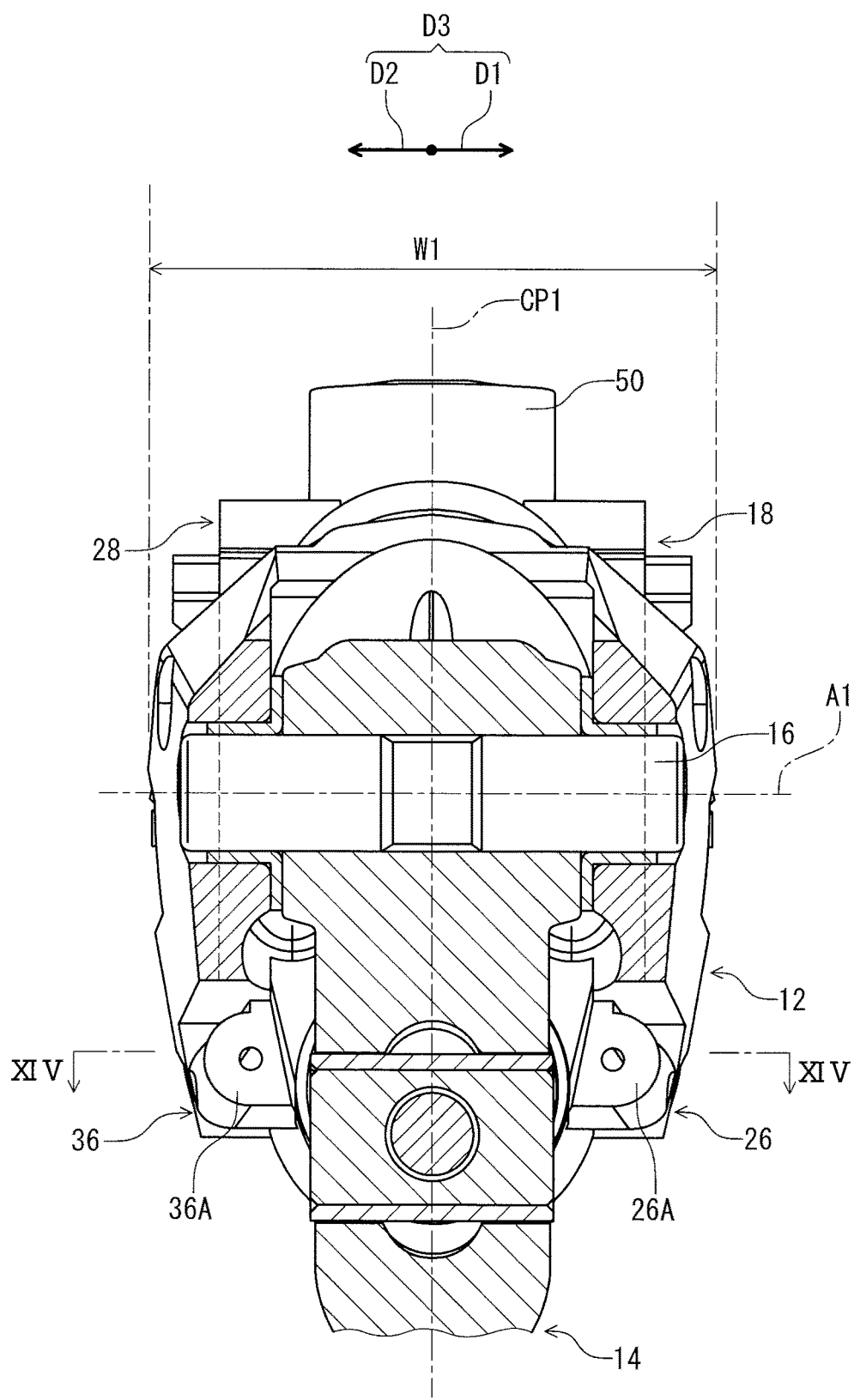
FIG. 7 is a cross-sectional view of the bicycle operating device taken along line VII-VII of FIG. 3 (first state).
Figure 8:
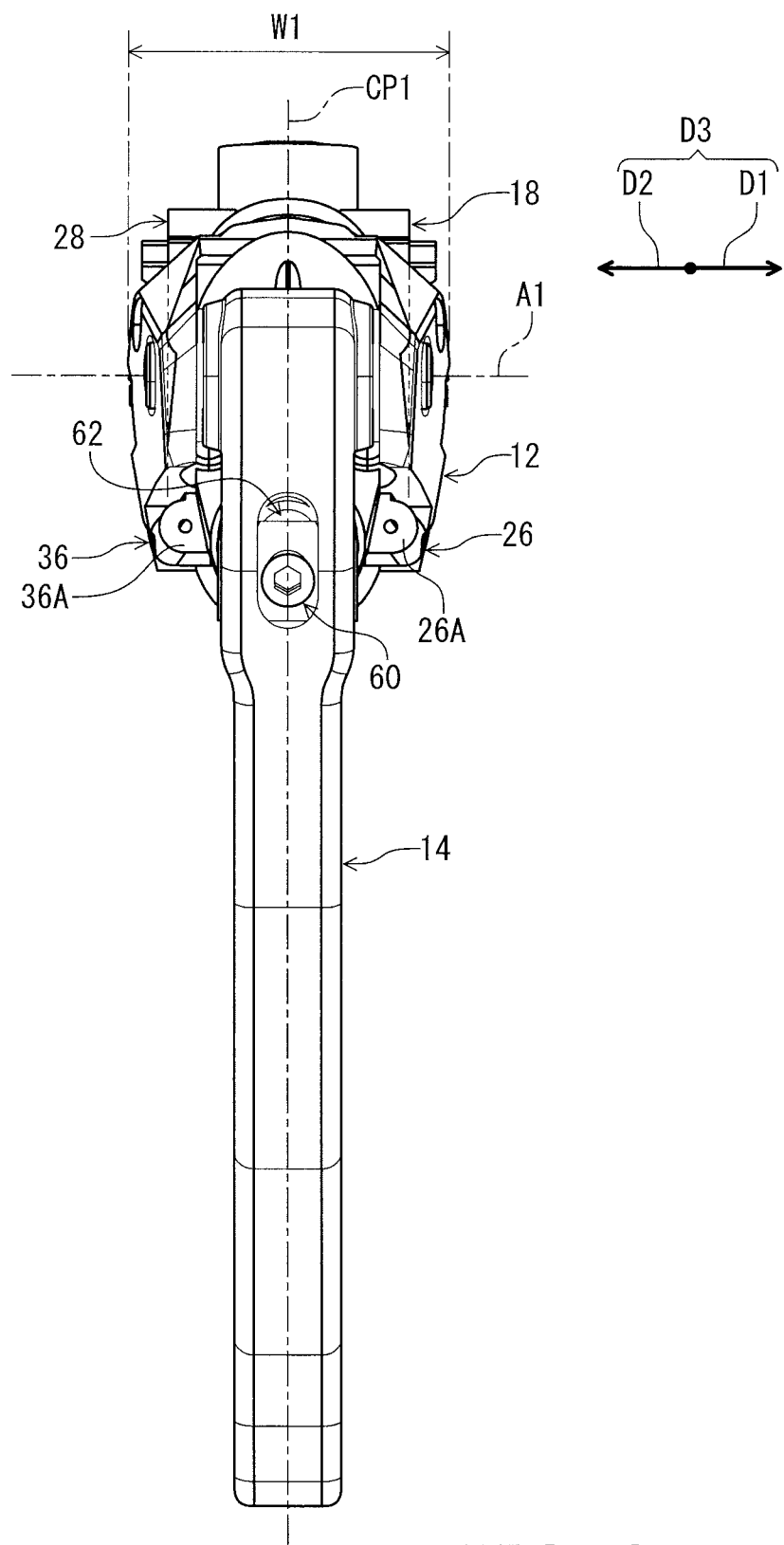
FIG. 8 is a front view of the bicycle operating device illustrated in FIG. 1, with a first cover structure, a second cover structure and an operating structure omitted.

As seen in FIG. 7, the base member 12 has a maximum axial width W1 defined in an axial direction D3 of the pivot axis A1. The base member 12 has a base center plane CP1 defined to bisect the maximum axial width W1. The base center plane CP1 is perpendicular to the pivot axis A1. The base center plane CP1 is provided between the first arrangement part 18 and the second arrangement part 28 in the axial direction D3. The first arrangement part 18 is symmetrical to the second arrangement part 28 with respect to the base center plane CP1. As seen in FIG. 8, the operating member 14 is symmetrical with respect to the base center plane CP1 perpendicular to the pivot axis A1. However, the first arrangement part 18 can be asymmetrical to the second arrangement part 28 with respect to the base center plane CP1. The operating member 14 can be asymmetrical with respect to the base center plane CP1.

Figure 9:
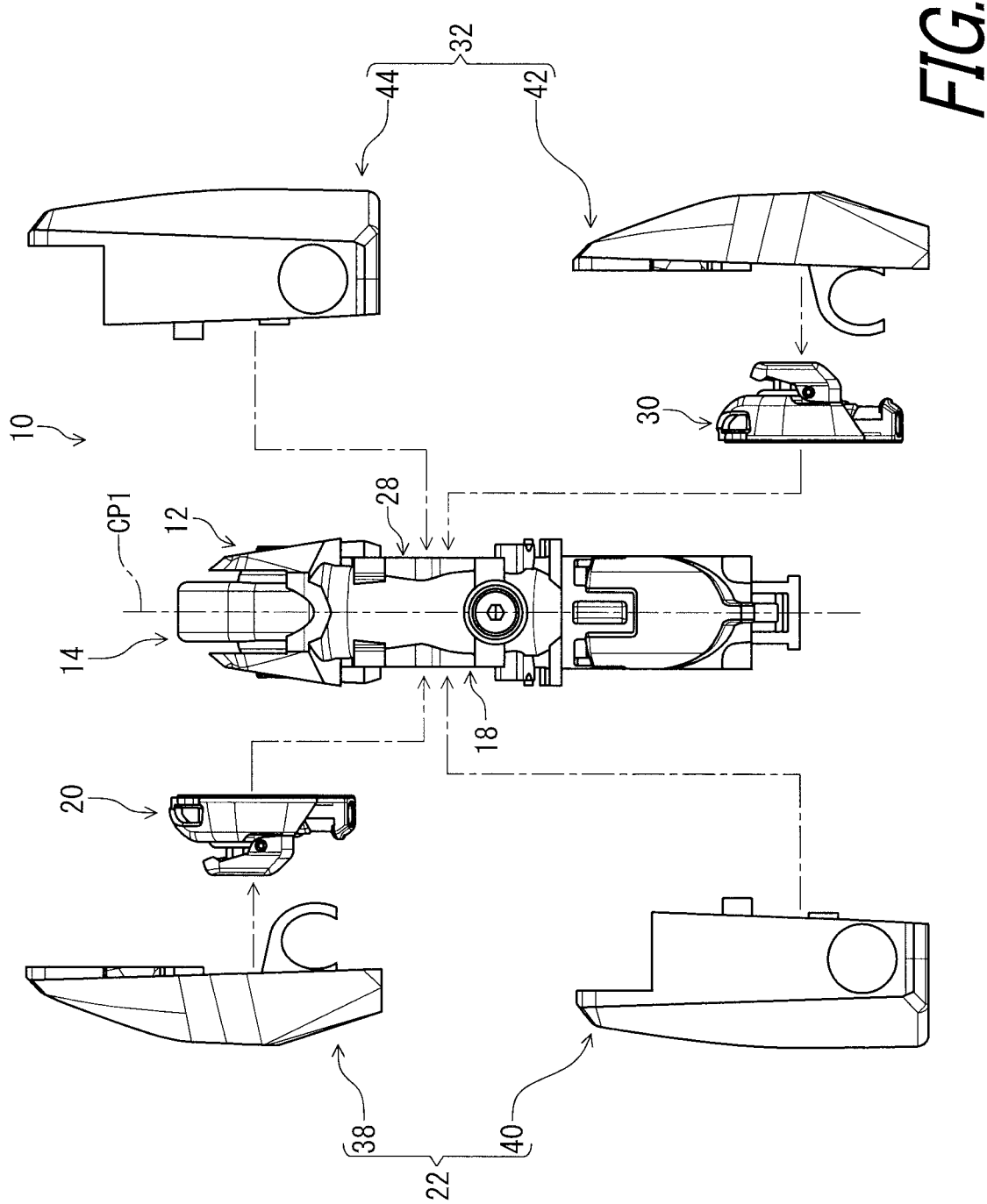
FIG. 9 is an exploded plan view of the bicycle operating device illustrated in FIG. 1 (first and second states).

As seen in FIG. 9, the bicycle operating device 10 further comprises the first cover structure 22. The first cover structure 22 includes at least one of a first cover 38 and a second cover 40. In this embodiment, the first cover structure 22 includes the first cover 38 and the second cover 40. However, the first cover structure 22 can include one of the first cover 38 and the second cover 40. The first cover structure 22 can include another cover instead of or in addition to at least one of the first cover 38 and the second cover 40. The first cover 38 is selectively arrangeable to the first arrangement part 18. The second cover 40 is selectively arrangeable to the first arrangement part 18. The second cover 40 has a shape different from a shape of the first cover 38.

The bicycle operating device 10 further comprises the second cover structure 32. The second cover structure 32 includes at least one of a third cover 42 and a fourth cover 44. In this embodiment, the second cover structure 32 includes the third cover 42 and the fourth cover 44. However, the second cover structure 32 can include one of the third cover 42 and the fourth cover 44. The second cover structure 32 can include another cover instead of or in addition to at least one of the third cover 42 and the fourth cover 44. The third cover 42 is selectively arrangeable to the second arrangement part 28. The fourth cover 44 is selectively arrangeable to the second arrangement part 28. The fourth cover 44 has a shape different from a shape of the third cover 42.

Figure 10:
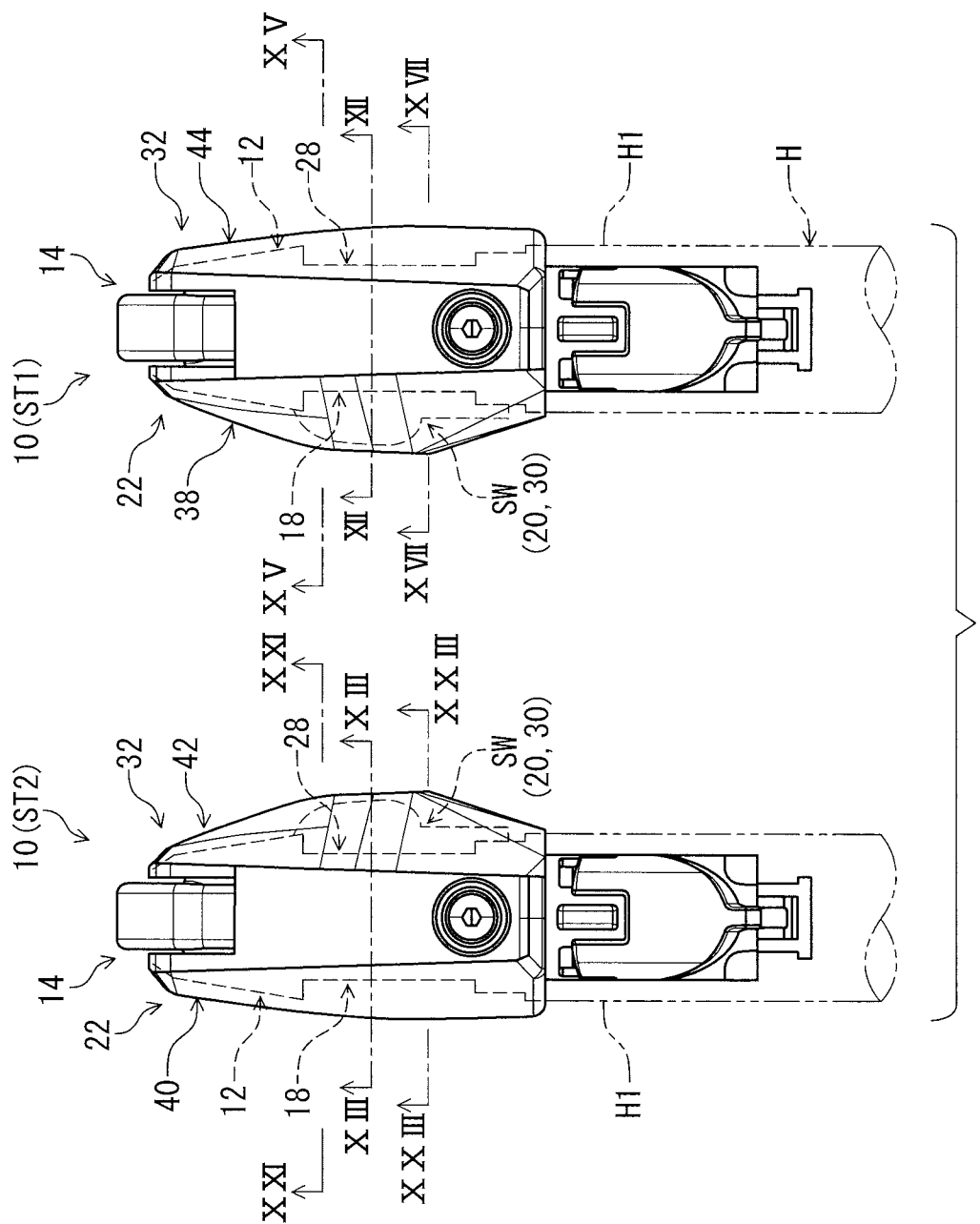
FIG. 10 is a plan view of the bicycle operating device illustrated in FIG. 1 (first and second states).
Figure 11:
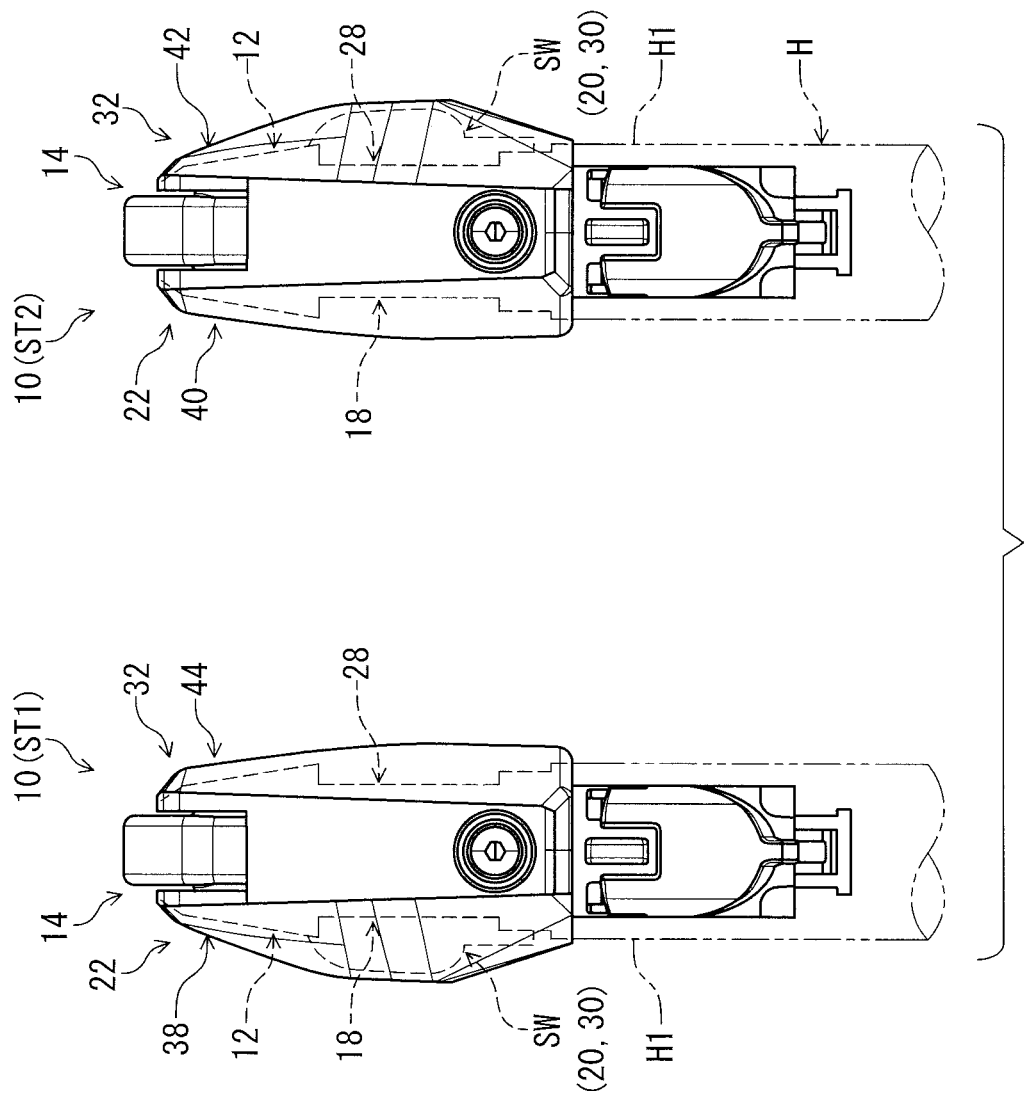
FIG. 11 is a plan view of a bicycle operating device in accordance with an modification of the first embodiment (first and second states).

In this embodiment, as seen in FIG. 10, the fourth cover 44 is arranged to the second arrangement part 28 in the first state ST1 where the first cover 38 is arranged to the first arrangement part 18. The first operating structure 20 is arranged to the first arrangement part 18 in the first state ST1. The bicycle operating device 10 is used as the right-hand side control device in this state (the first state ST1). The second cover 40 is arranged to the first arrangement part 18 in the second state ST2 where the third cover 42 is arranged to the second arrangement part 28. The second operating structure 30 (e.g., the first operating structure 20) is arranged to the second arrangement part 28 in the second state ST2. The bicycle operating device 10 is used as the left-hand side control device in this state (the second state ST2). As seen in FIG. 11, however, the bicycle operating device 10 including the first cover 38, the fourth cover 44, and the first operating structure 20 can be used as the left-hand side control device. The bicycle operating device 10 including the second cover 40, the third cover 42, and the second operating structure 30 can be used as the right-hand side control device.

Figure 12:
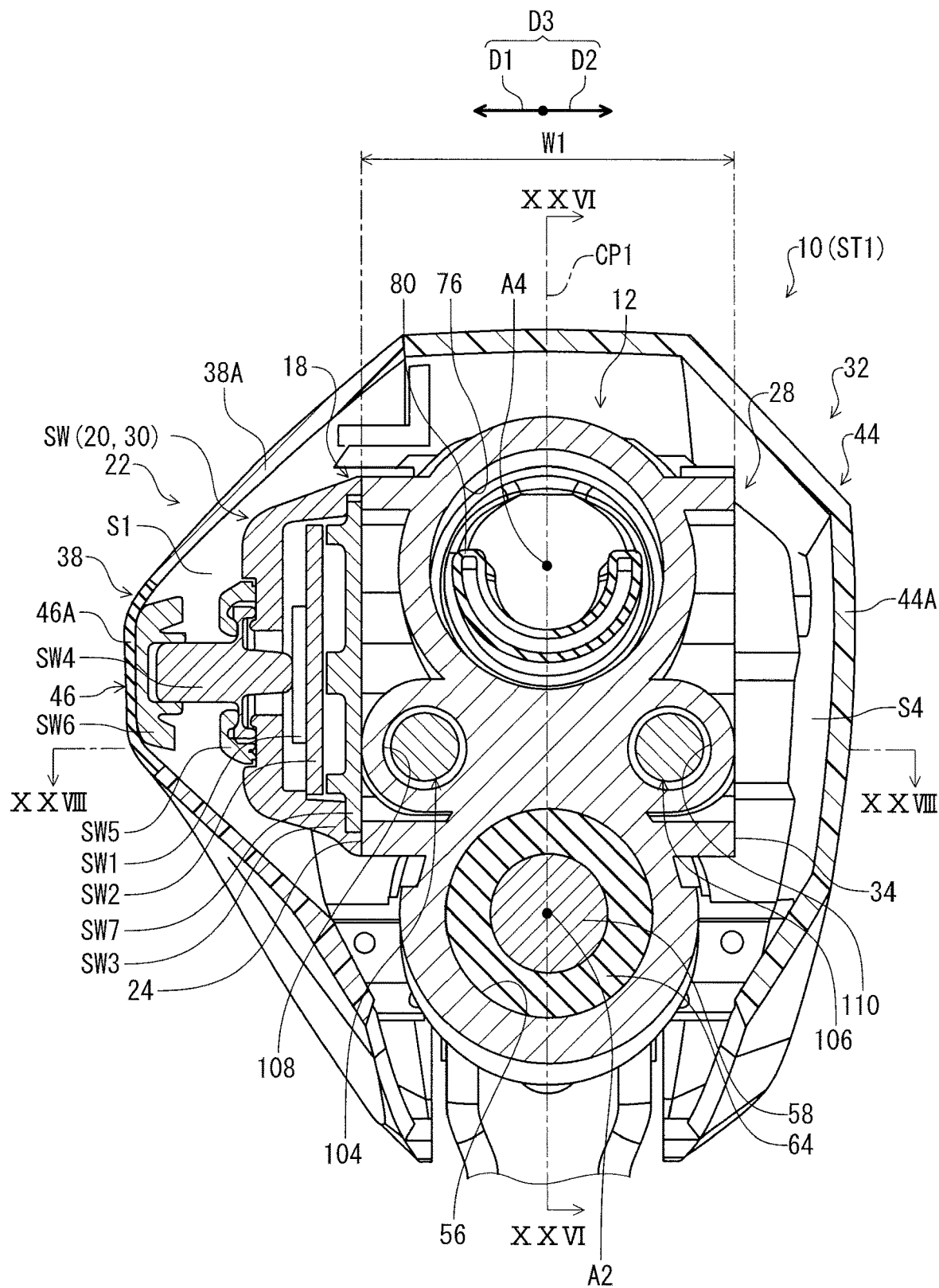
FIG. 12 is a cross-sectional view of the bicycle operating device taken along line XII-XII of FIG. 10 (first state).

As seen in FIG. 12, the first cover 38 includes a first facing part 38A spaced apart from the first arrangement part 18 to define a first space 51 in which the first operating structure 20 is arrangeable in the first state ST1 where the first cover 38 is arranged to the first arrangement part 18. The first cover 38 includes a first access portion 46 from which the first operating structure 20 is operated in the first state ST1. The first access portion 46 includes a first elastic member 46A contactable with the first operating structure 20 in the first state ST1. However, the first access portion 46 can include a through-hole instead of or in addition to the first elastic member 46A. The first elastic member 46A is made of an elastic material such as rubber. The other part of the first cover 38 is made of a resin material. However, the first cover 38 can be entirely made of the elastic material or other materials.

The fourth cover 44 includes a fourth facing part 44A spaced apart from the second arrangement part 28 to define a space S4 in the first state ST1 where the fourth cover 44 is arranged to the second arrangement part 28. The fourth cover 44 is made of a resin material. However, the fourth cover 44 can be at least partly made of the elastic material or other materials.

Figure 13:
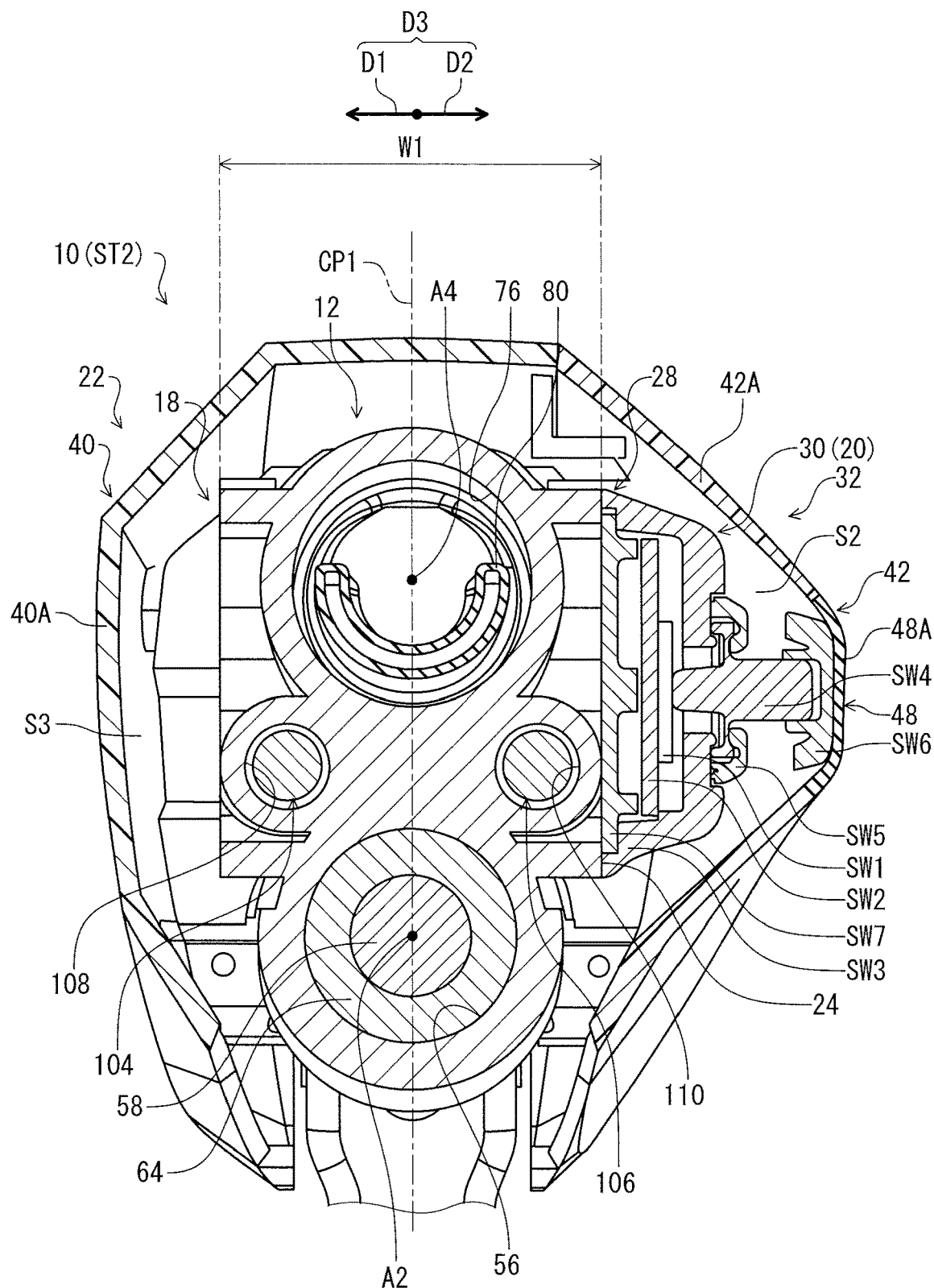
FIG. 13 is a cross-sectional view of the bicycle operating device taken along line XIII-XIII of FIG. 10 (second state).

As seen in FIG. 13, the third cover 42 includes a second facing part 42A spaced apart from the second arrangement part 28 to define a second space S2 in which the second operating structure 30 is arrangeable in the second state ST2 where the third cover 42 is arranged to the second arrangement part 28. The third cover 42 includes a second access portion 48 from which the second operating structure 30 is operated in the second state ST2. The second access portion 48 includes a second elastic member 48A contactable with the second operating structure 30 in the second state ST2. However, the second access portion 48 can include a through-hole instead of or in addition to the second elastic member 48A. The second elastic member 48A is made of an elastic material such as rubber. The other part of the third cover 42 is made of a resin material. However, the third cover 42 can be entirely made of the elastic material or other materials.

The second cover 40 includes a third facing part 40A spaced apart from the first arrangement part 18 to define a space S3 in the second state ST2 where the second cover 40 is arranged to the first arrangement part 18. The second cover 40 is made of a resin material. However, the second cover 40 can be at least partly made of the elastic material or other materials.

In this embodiment, as seen in FIG. 10, the first cover 38 has a shape mirror symmetrical to a shape of the third cover 42. The second cover 40 has a shape mirror symmetrical to a shape of the fourth cover 44. However, the first cover 38 can have a shape asymmetrical to the shape of the third cover 42. The second cover 40 can have a shape asymmetrical to the shape of the fourth cover 44.

Figure 14:
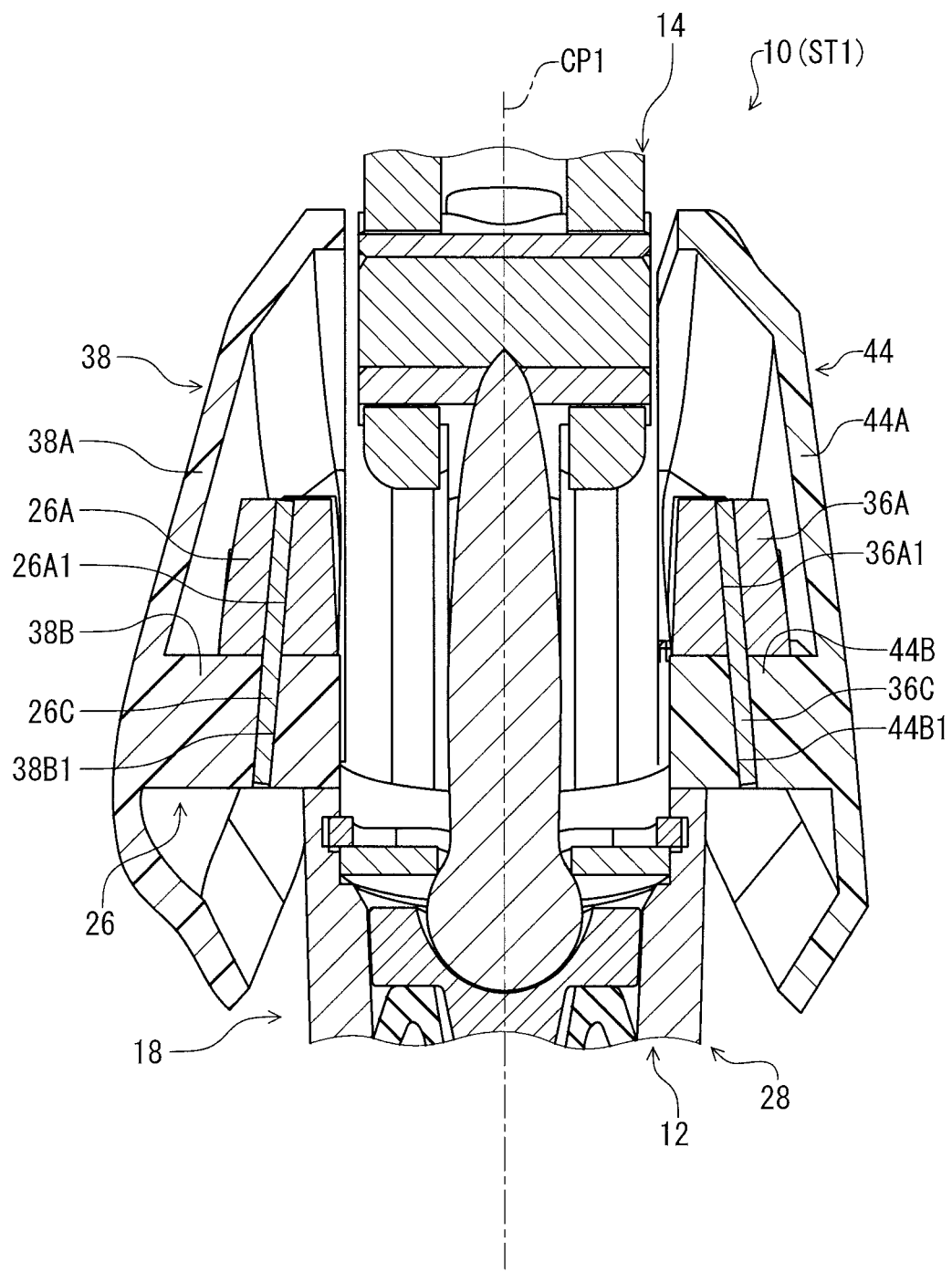
FIG. 14 is a cross-sectional view of the bicycle operating device taken along line XIV-XIV of FIG. 7 (first state).

As seen in FIG. 6, the first cover 38 includes first coupling parts 38B, 38C, and 38D. The first coupling parts 38B, 38C, and 38D extend from the first facing part 38A toward the second arrangement part 28. As seen in FIG. 5, the first attachment portion 26 includes first receiving parts 26A and 26B. As seen in FIG. 14, the first coupling part 38B is coupled to the first receiving part 26A with a pin 26C. The first coupling part 38B includes a first through-hole 38B1. The first receiving part 26A includes a first receiving through-hole 26A1. The pin 26C is press-fitted in the first through-hole 38B1 and the first receiving through-hole 26A1. The first coupling part 38B can be coupled to the first receiving part 26A with another fastener such as a screw.

Figure 15:
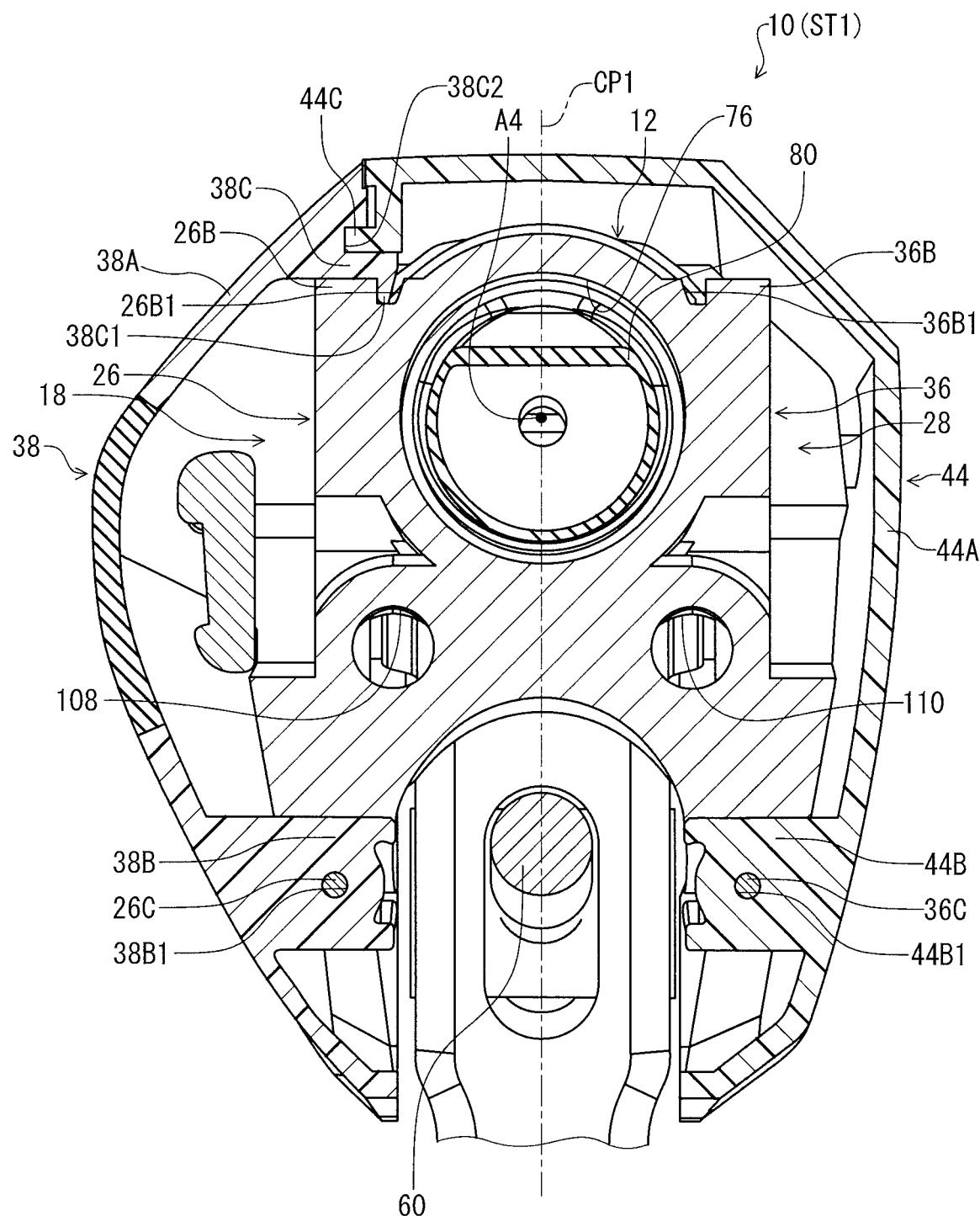
FIG. 15 is a cross-sectional view of the bicycle operating device taken along line XV-XV of FIG. 10 (first state).

As seen in FIG. 15, the first coupling part 38C is snap-fitted in the first receiving part 26B. The first coupling part 38C includes a first pawl 38C1. The first receiving part 26B includes a first groove 26B1. The first pawl 38C1 is provided in the first groove 26B1 in the first state ST1.

Figure 16:
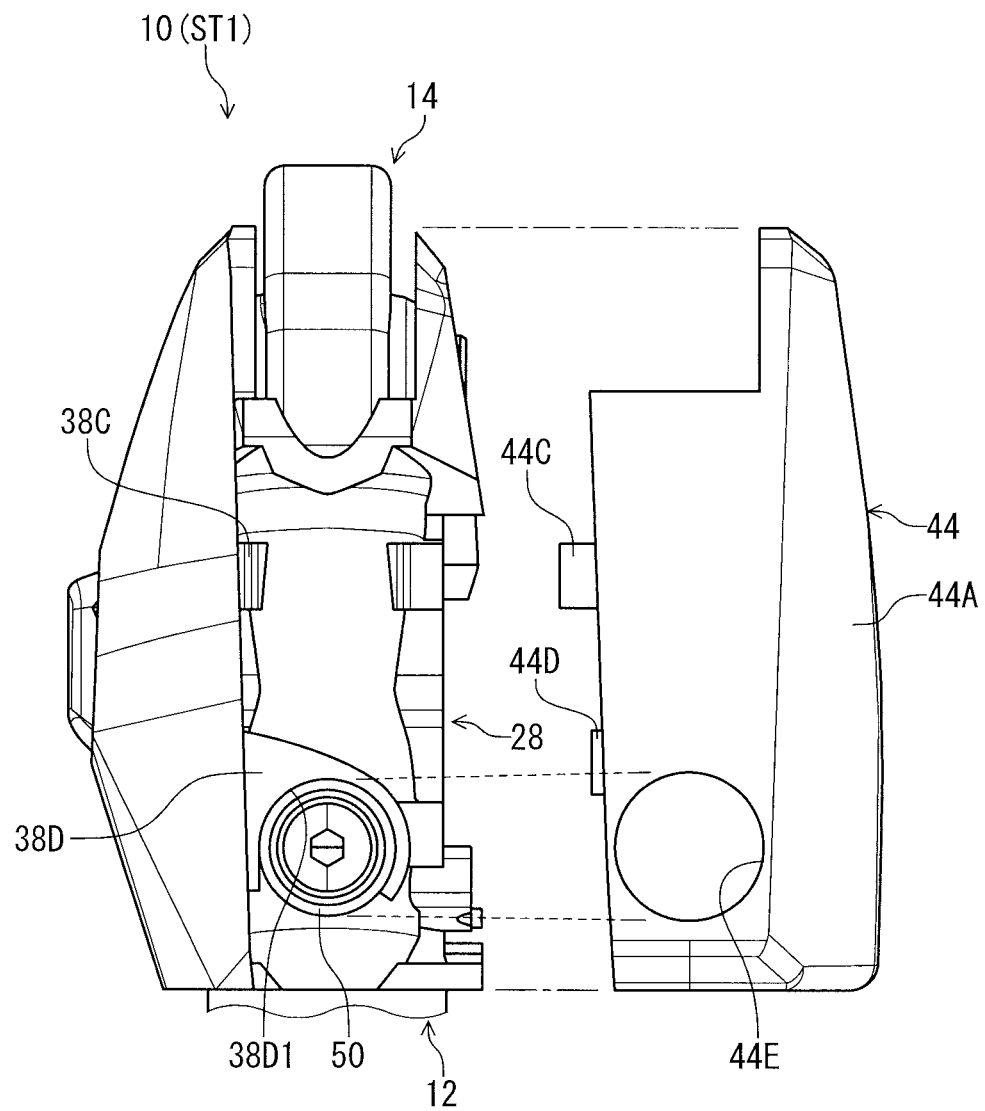
FIG. 16 is an exploded plan view of the bicycle operating device illustrated in FIG. 1 (first state).

As seen in FIG. 6, the base member 12 includes a tubular part 50. As seen in FIG. 16, the first coupling part 38D is snap-fitted to the tubular part 50. The first coupling part 38D includes a first opening 38D1. The tubular part 50 is provided in the first opening 38D1 in the first state ST1.

As seen in FIG. 5, the fourth cover 44 includes fourth coupling parts 44B, 44C, and 44D. The fourth coupling parts 44B, 44C, and 44D extend from the fourth facing part 44A toward the second arrangement part 28. As seen in FIG. 6, the second attachment portion 36 includes second receiving parts 36A and 36B. As seen in FIG. 14, the fourth coupling part 44B is coupled to the second receiving part 36A with a pin 36C. The fourth coupling part 44B includes a second through-hole 44B1. The second receiving part 36A includes a second receiving through-hole 36A1. The pin 36C is press-fitted in the second through-hole 44B1 and the second receiving through-hole 36A1. The fourth coupling part 44B can be coupled to the second receiving part 36A with another fastener such as a screw.

As seen in FIG. 15, the fourth coupling part 44C is coupled to first coupling part 38C in the first state ST1. The first coupling part 38C includes a groove 38C2. An end of the fourth coupling part 44C is provided in the groove 38C2 in the first state ST1. The first coupling part 38C is provided between the fourth coupling part 44C and the first receiving part 26B in the first state ST1. The second receiving part 36B includes a second groove 36B1. The second groove 36B1 is not used in the first state ST1. However, the fourth cover 44 can include another coupling portion engaged in the second groove 36B1.

Figure 17:
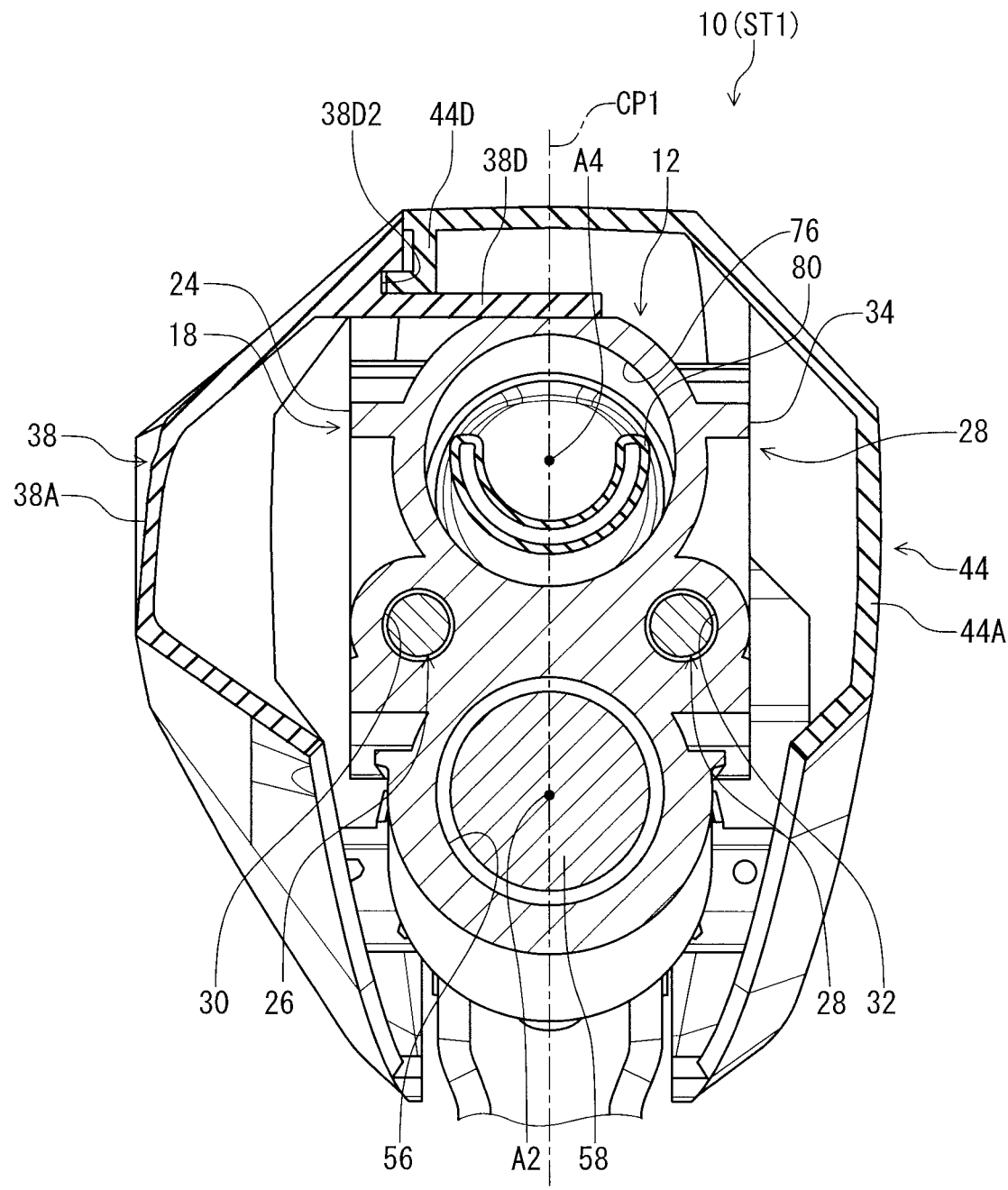
FIG. 17 is a cross-sectional view of the bicycle operating device taken along line XVII-XVII of FIG. 10 (first state).

As seen in FIG. 17, the fourth coupling part 44D is coupled to the first coupling part 38D in the first state ST1. The first coupling part 38D includes a groove 38D2. An end of the fourth coupling part 44D is provided in the groove 38D2 in the first state ST1. The first coupling part 38D is provided between the fourth coupling part 44D and the base member 12 in the first state ST1. As seen in FIG. 16, the fourth cover 44 includes a coupling opening 44E. The tubular part 50 is provided in the coupling opening 44E in the first state ST1.

Figure 18:
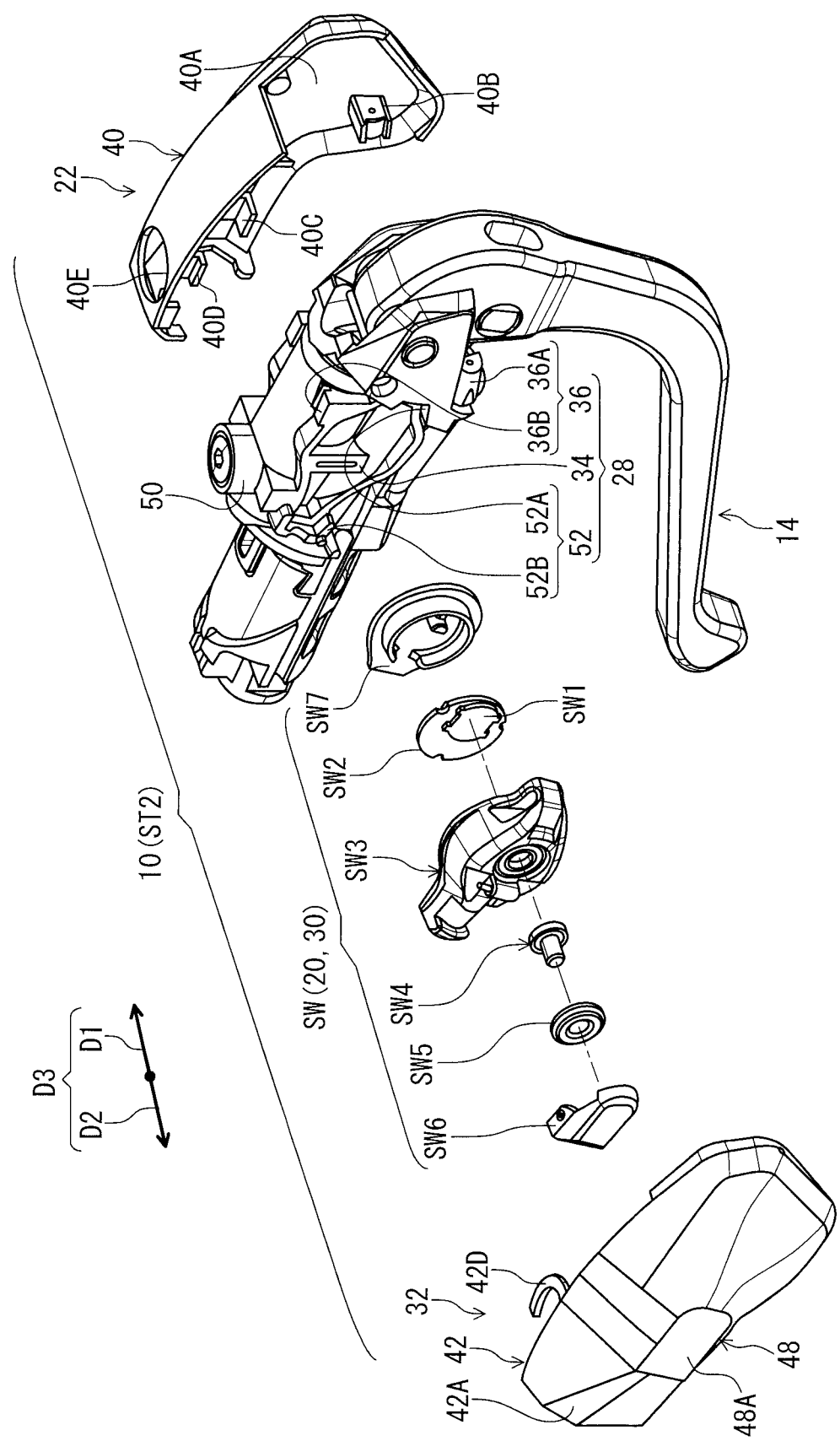
FIG. 18 is an exploded perspective view of the bicycle operating device illustrated in FIG. 1 (second state).
Figure 19:
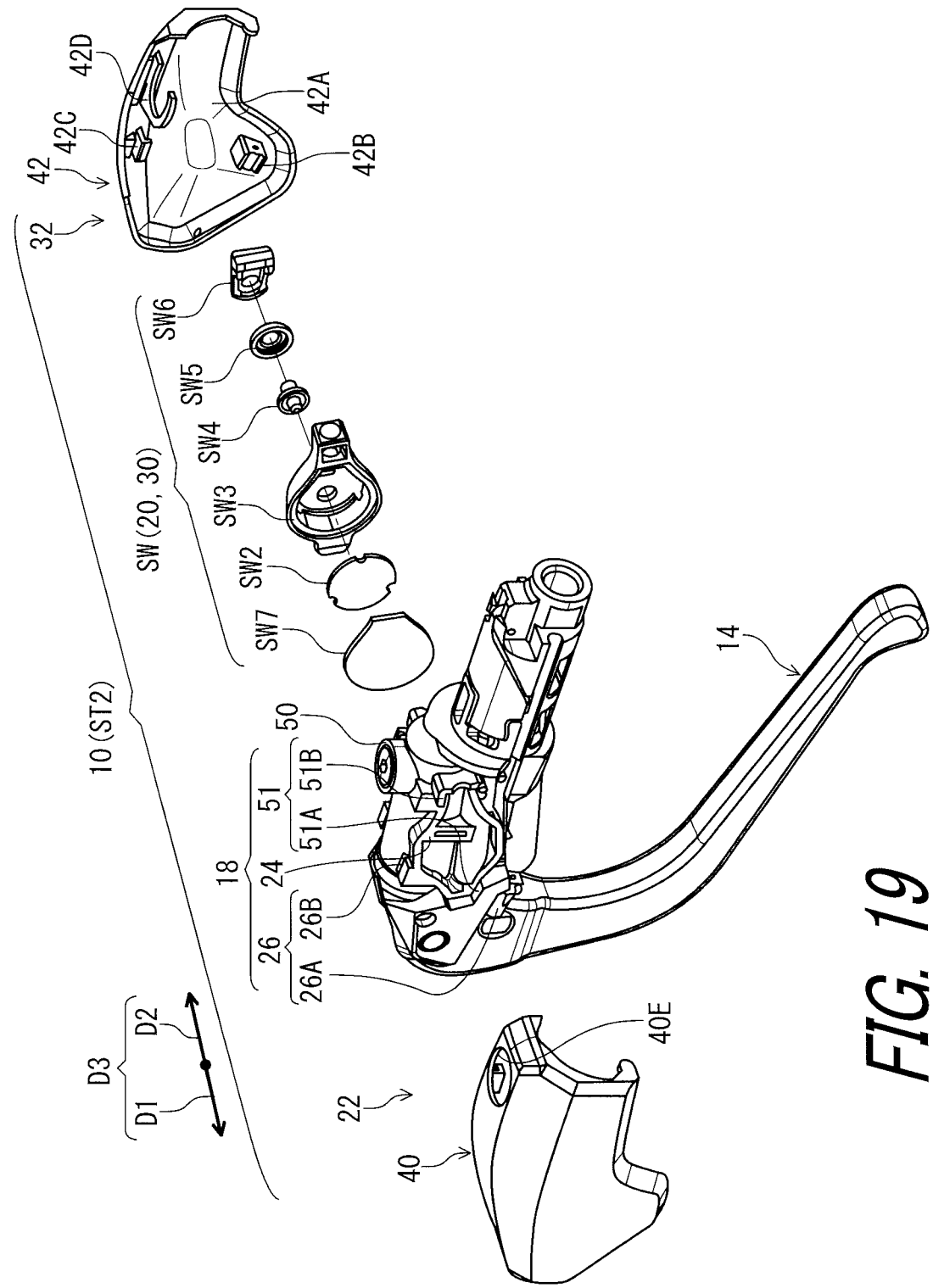
FIG. 19 is another exploded perspective view of the bicycle operating device illustrated in FIG. 1 (second state).
Figure 20:
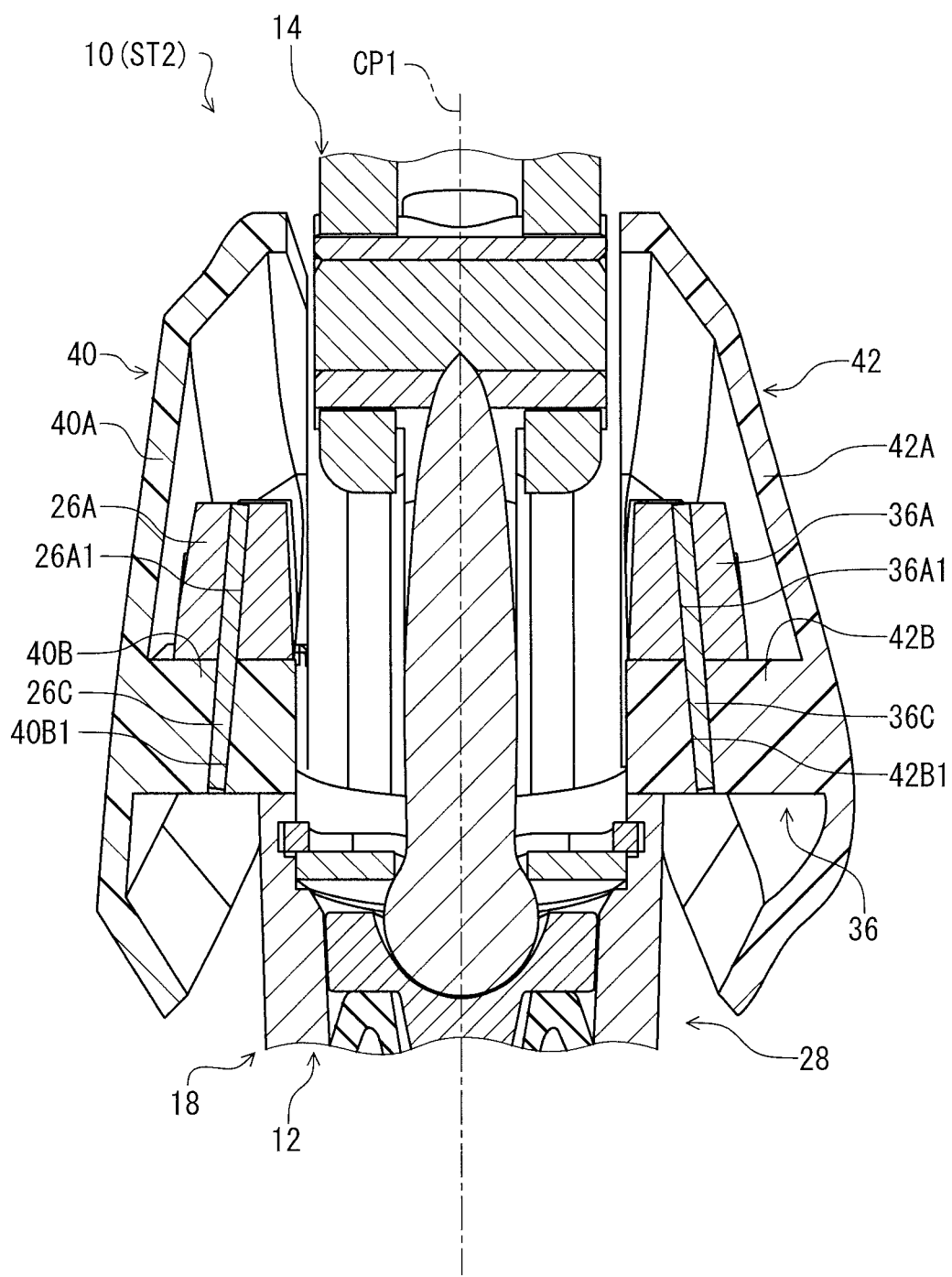
FIG. 20 is a cross-sectional view of the bicycle operating device corresponding to FIG. 14 (second state).

As seen in FIGS. 18 and 19, the third cover 42 includes third coupling parts 42B, 42C, and 42D. The third coupling parts 42B, 42C, and 42D extend from the second facing part 42A toward the second arrangement part 28. As seen in FIG. 20, the third coupling part 42B is coupled to the second receiving part 36A with the pin 36C. The third coupling part 42B includes a third through-hole 42B1. The pin 36C is press-fitted in the third through-hole 42B1 and the second receiving through-hole 36A1. The third coupling part 42B can be coupled to the second receiving part 36A with another fastener such as a screw.

Figure 21:
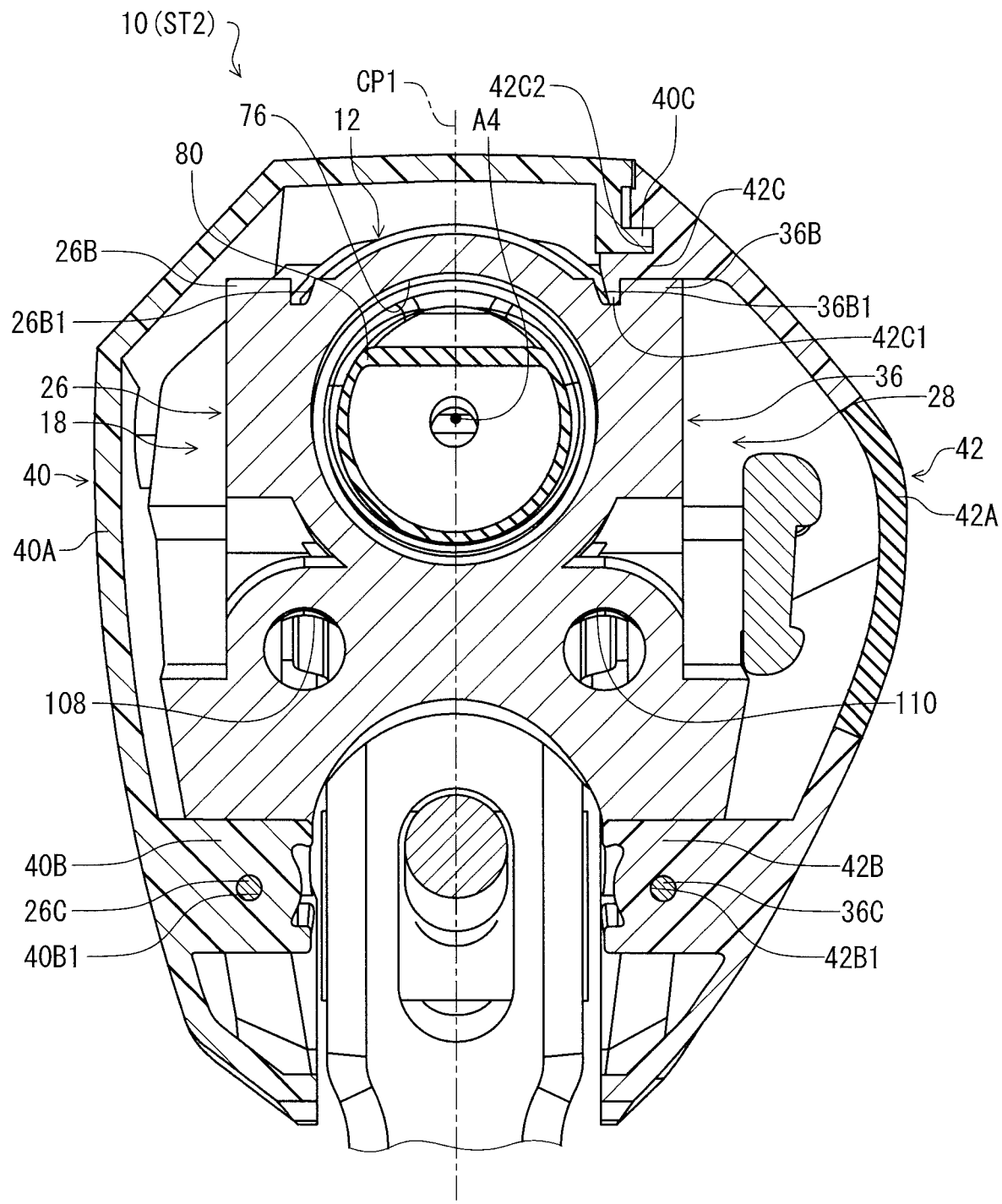
FIG. 21 is a cross-sectional view of the bicycle operating device taken along line XXI-XXI of FIG. 10 (second state).

As seen in FIG. 21, the third coupling part 42C is snap-fitted in the second receiving part 36B. The third coupling part 42C includes a third pawl 42C1. The third pawl 42C1 is provided in the second groove 36B1 in the second state ST2.

Figure 22:
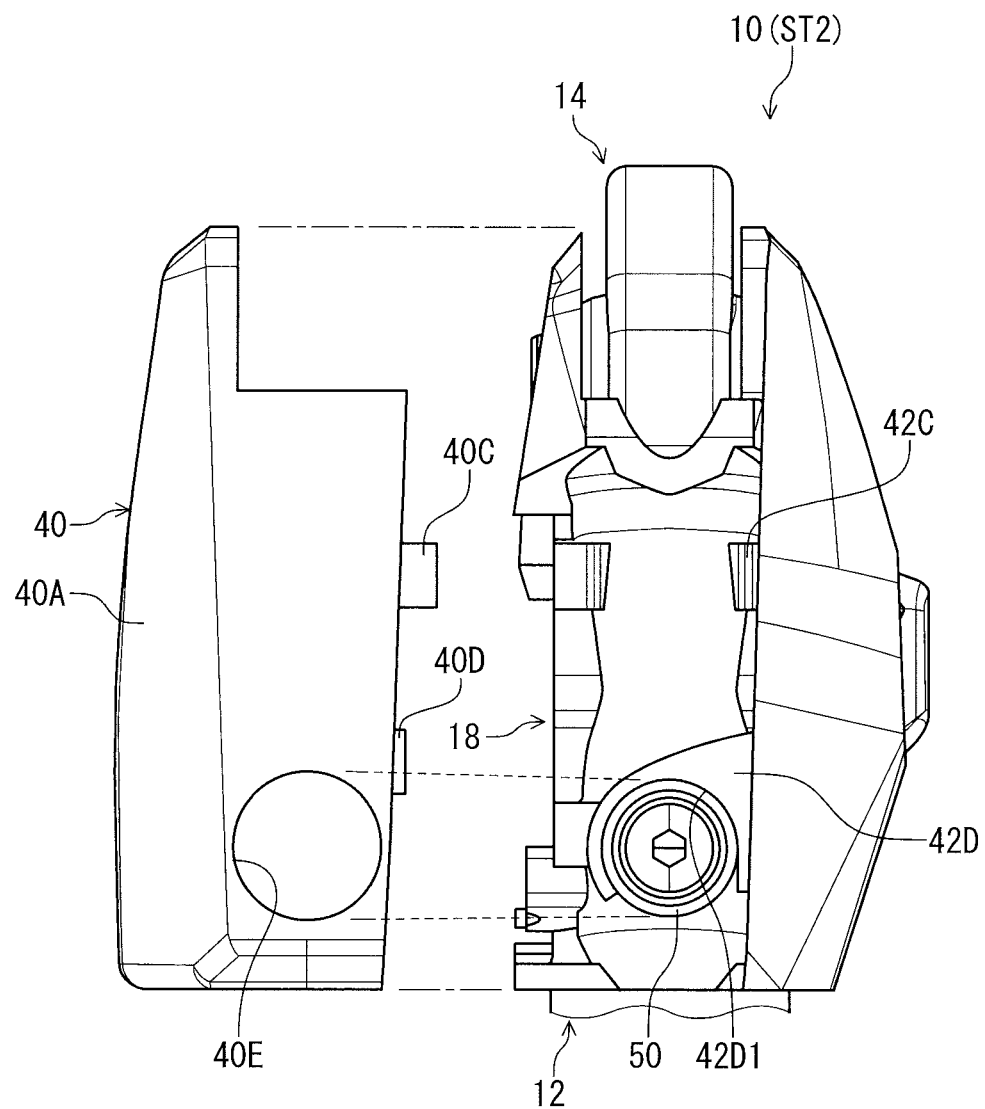
FIG. 22 is an exploded plan view of the bicycle operating device illustrated in FIG. 1 (second state).

As seen in FIG. 22, the third coupling part 42D is snap-fitted to the tubular part 50. The third coupling part 42D includes a third opening 42D1. The tubular part 50 is provided in the third opening 42D1 in the second state ST2.

As seen in FIG. 19, the second cover 40 includes second coupling parts 40B, 40C, and 40D. The second coupling parts 40B, 40C, and 40D extend from the third facing part 40A toward the second arrangement part 28. As seen in FIG. 20, the second coupling part 40B is coupled to the first receiving part 26A with the pin 26C. The second coupling part 40B includes a second through-hole 40B1. The pin 26C is press-fitted in the second through-hole 40B1 and the first receiving through-hole 26A1. The second coupling part 40B can be coupled to the first receiving part 26A with another fastener such as a screw.

As seen in FIG. 21, the second coupling part 40C is coupled to third coupling part 42C in the second state ST2. The third coupling part 42C includes a groove 42C2. An end of the second coupling part 40C is provided in the groove 42C2 in the second state ST2. The third coupling part 42C is provided between the second coupling part 40C and the second receiving part 36B in the second state ST2. The first groove 26B1 is not used in the second state ST2. However, the second cover 40 can include another coupling portion engaged in the first groove 26B1.

Figure 23:
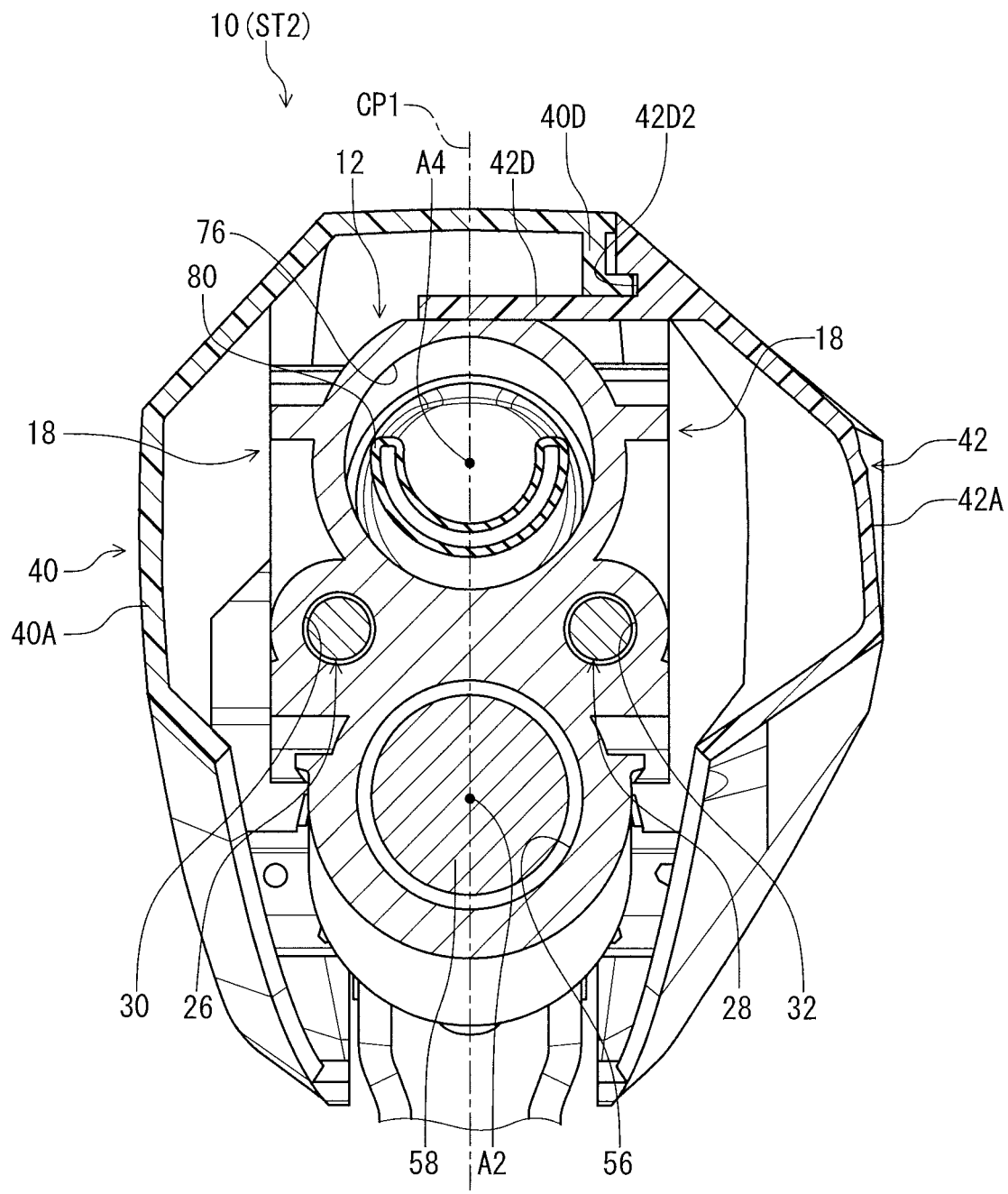
FIG. 23 is a cross-sectional view of the bicycle operating device taken along line XXIII-XXIII of FIG. 10 (second state).

As seen in FIG. 23, the second coupling part 40D is coupled to the third coupling part 42D in the second state ST2. The third coupling part 42D includes a groove 42D2. An end of the second coupling part 40D is provided in the groove 42D2 in the second state ST2. The third coupling part 42D is provided between the second coupling part 40D and the base member 12 in the second state ST2. As seen in FIG. 22, the second cover 40 includes a coupling opening 40E. The tubular part 50 is provided in the coupling opening 40E in the second state ST2.

As seen in FIG. 10, the electrical switch SW is selectively arrangeable to one of the first arrangement part 18 and the second arrangement part 28. The electrical switch SW (the first operating structure 20) is arranged to the first arrangement part 18 in the first state ST1. The electrical switch SW (the second operating structure 30) is arranged to the second arrangement part 28. In this embodiment, the electrical switch SW (the first operating structure 20) is arranged to the first arrangement part 18 without being secured to the second arrangement part 28 in the first state ST1. The electrical switch SW (the first operating structure 20) is arranged between the first arrangement part 18 and the first cover 38 without being secured to the first arrangement part 18 in the first state ST1. Similarly, the electrical switch SW (the second operating structure 30) is arranged to the second arrangement part 28 without being secured to the second arrangement part 28 in the second state ST2. The electrical switch SW (the second operating structure 30) is arranged between the second arrangement part 28 and the third cover 42 without being secured to the second arrangement part 28 in the second state ST2. However, the electrical switch SW (the first operating structure 20) can be secured to the first arrangement part 18 in the first state ST1. The electrical switch SW (the second operating structure 30) can be secured to the second arrangement part 28 in the second state ST2.

As seen in FIGS. 5 and 6, the electrical switch SW includes a switch circuit SW1, a substrate SW2, a switch housing SW3, a button SW4, a ring SW5, an operating part SW6, and a spacer SW7. The switch circuit SW1 includes an electric contact (not shown) and is electrically mounted on the substrate SW2. The switch circuit SW1 is a normally open switch configured to close in response to an operation force. The switch circuit SW1 and the substrate SW2 are provided in the switch housing SW3. The substrate SW2 is secured to the switch housing SW3. The button SW4 is contactable with the switch circuit SW1 and is movably mounted to the switch housing SW3 to transmit the operation force from the user to the switch circuit SW1. The ring SW5 is attached to the switch housing SW3 to movably support the button SW4 relative to the switch housing SW3. The operating part SW6 is pivotally coupled to the switch housing SW3 with a pin SW8. The spacer SW7 is provided in the switch housing SW3 and is provided between the substrate SW2 and the first arrangement surface 24 of the first arrangement part 18. As seen in FIG. 3, the electrical switch SW has a symmetrical shape with respect to a longitudinal center plane LP1 of the electrical switch SW. In this embodiment, the longitudinal center plane LP1 is defined to bisect the operating part SW6 and the pin SW8. The switch housing SW3 has a symmetrical shape with respect t to the longitudinal center plane LP1.

As seen in FIG. 12, the switch housing SW3 and the spacer SW7 are in contact with the first arrangement surface 24 in the first state ST1 where the electrical switch SW and the first cover structure 22 are arranged to the first arrangement part 18. The operating part SW6 is in contact with the first cover 38 in the first state ST1. The operating part SW6 is pressed by the user when the user operates the electrical switch SW. The electrical switch SW is electrically connected to the additional bicycle component BC2 with a control cable C. However, the electrical switch SW can be wirelessly connected to the additional bicycle component BC2. The bicycle operating device 10 can comprise, as the first operating structure 20 and the second operating structure 30 which are identical to each other, a mechanical operating structure configured to pull and release an inner wire of a mechanical control cable such as a Bowden cable.

As seen in FIG. 5, the first arrangement part 18 includes a first switch support 51. The first switch support 51 includes a first support recess 51A and a first support rib 51B. As seen in FIG. 3, an end of the electrical switch SW is provided in the first support recess 51A in the first state ST1. The other end of the electrical switch SW is supported by the first support rib 51B in the first state ST1. However, the first switch support 51 can be omitted from the first arrangement part 18.

Figure 24:
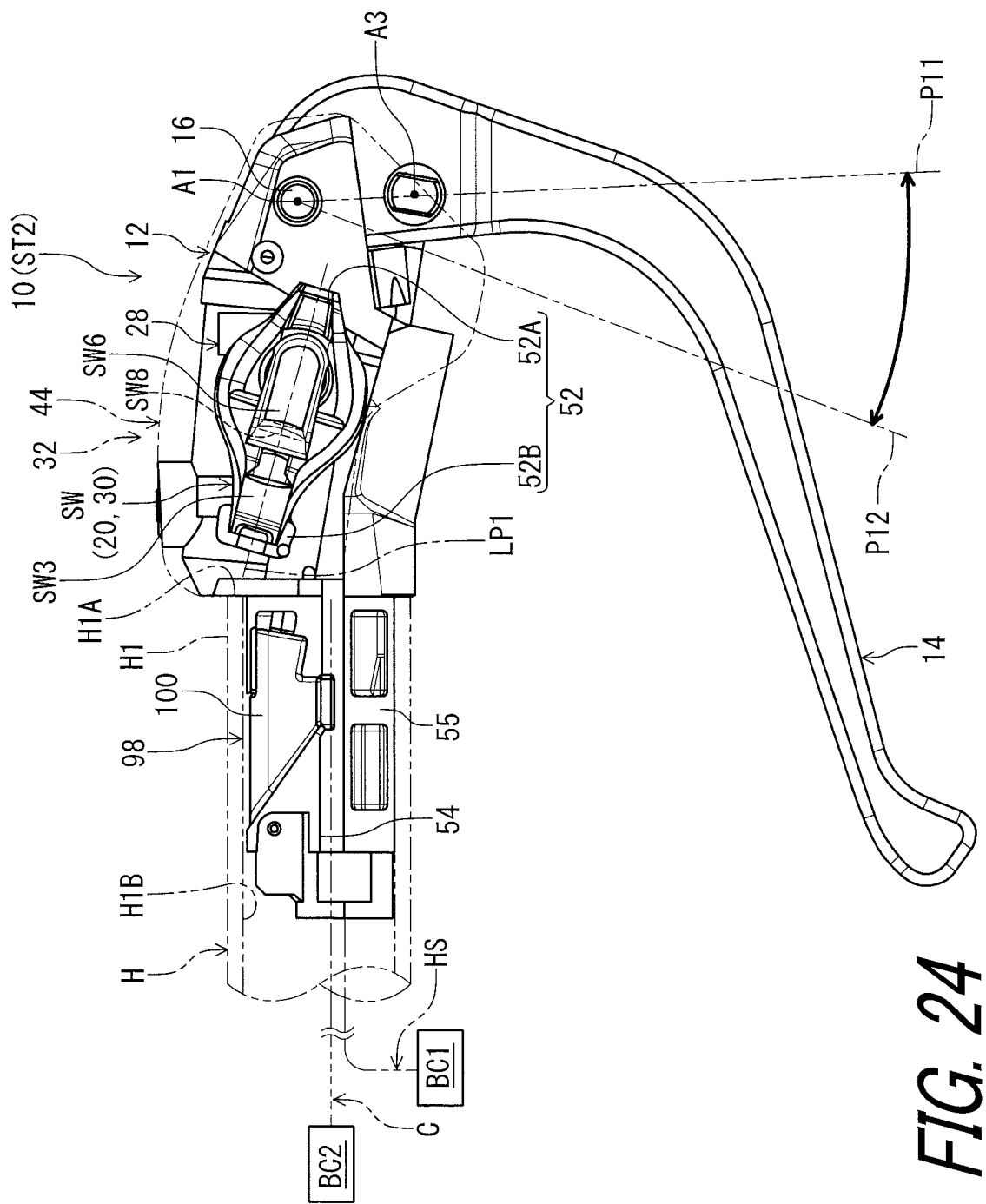
FIG. 24 is a side elevational view of the bicycle operating device illustrated in FIG. 1 (second state).

As seen in FIG. 6, the second arrangement part 28 includes a second switch support 52. The second switch support 52 includes a second support recess 52A and a second support rib 52B. As seen in FIG. 24, an end of the electrical switch SW is provided in the second support recess 52A in the second state ST2. The other end of the electrical switch SW is supported by the second support rib 52B in the second state ST2. However, the second switch support 52 can be omitted from the second arrangement part 28.

As seen in FIGS. 3 and 4, the base member 12 includes a first cable guide groove 53 and a second cable guide groove 54. The base member 12 includes a mounting portion 55 configured to be mounted within an interior of the bar end H1 of the bicycle handlebar H in the mounting state where the base member 12 is mounted to the bar end H1 of the bicycle handlebar H. The first cable guide groove 53 is provided on an outer circumferential surface of the mounting portion 55. The second cable guide groove 54 is provided on the outer circumferential surface of the mounting portion 55. As seen in FIG. 3, the first cable guide groove 53 extends from the first arrangement part 18. As seen in FIG. 4, the second cable guide groove 54 extends from the second arrangement part 28. At least one of the first cable guide groove 53 and the second cable guide groove 54 can be provided at a position other than the mounting portion 55. At least one of the first cable guide groove 53 and the second cable guide groove 54 can be omitted from the base member 12.

Figure 25:
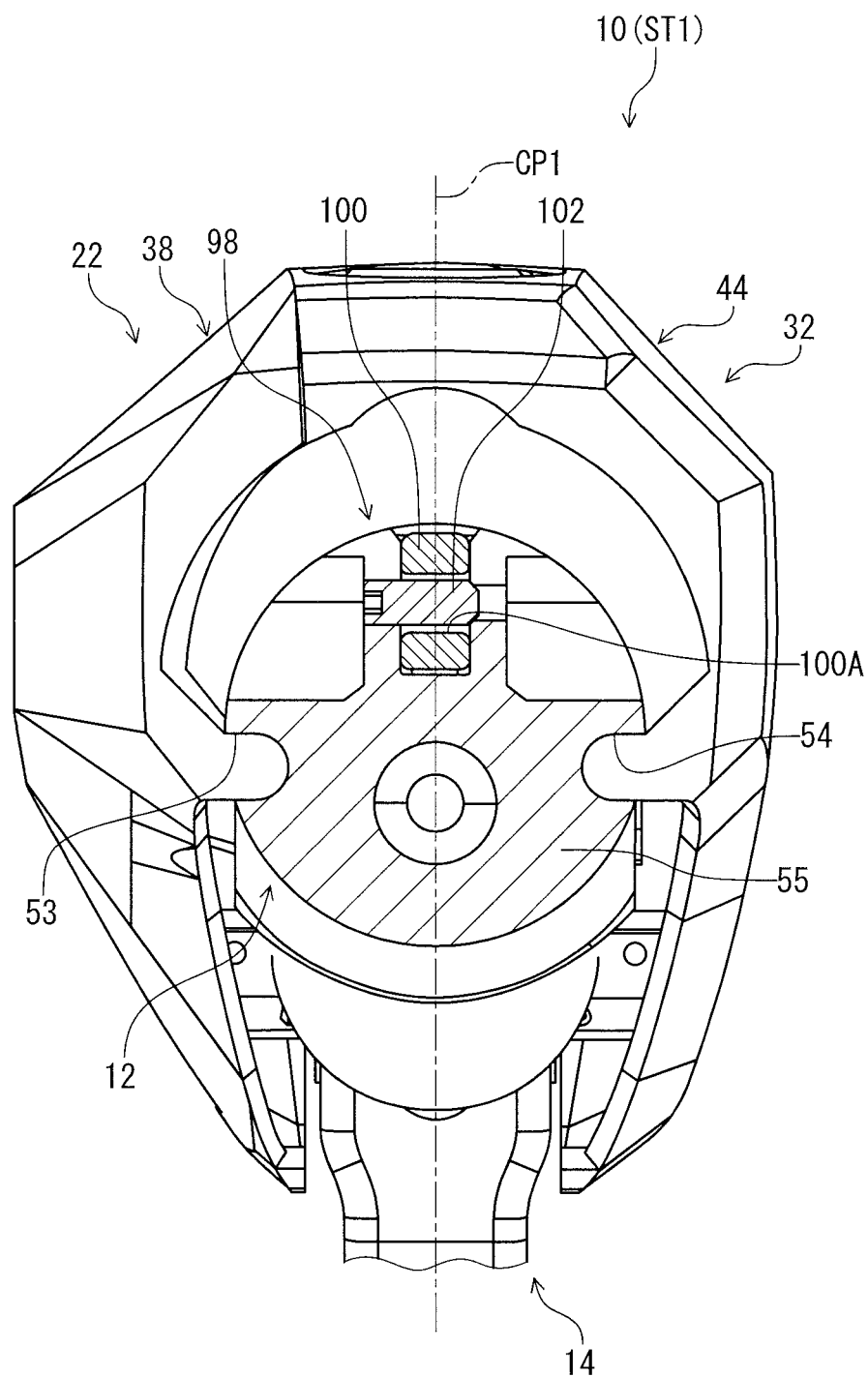
FIG. 25 is a cross-sectional view of the bicycle operating device taken along line XXV-XXV of FIG. 3 (first state).

As seen in FIG. 25, the second cable guide groove 54 is provided on a reverse side of the first cable guide groove 53 relative to the base center plane CP1. The first cable guide groove 53 is symmetrical to the second cable guide groove 54 with respect to the base center plane CP1. As seen in FIG. 3, the control cable C is provided in the first cable guide groove 53 in the first state ST1. However, the control cable C is provided in the second cable guide groove 54 in the second state ST2.

Figure 26:
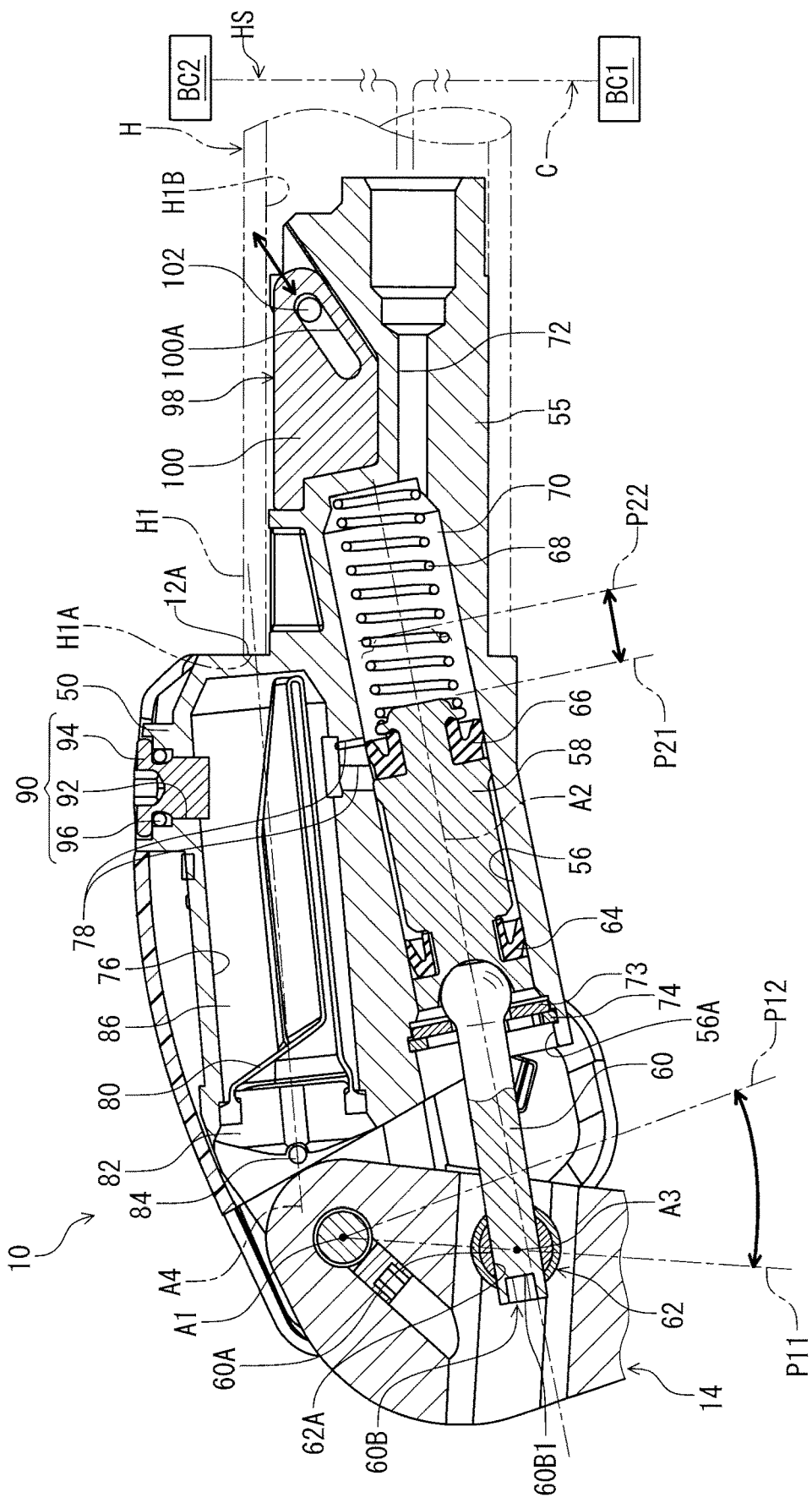
FIG. 26 is a cross-sectional view of the bicycle operating device taken along line XXVI-XXVI of FIG. 12 (first state).

As seen in FIG. 26, the base member 12 includes a cylinder bore 56. The cylinder bore 56 has a cylinder center axis A2. The cylinder bore 56 extends along the cylinder center axis A2. The bicycle operating device 10 comprises a piston 58 movably provided in the cylinder bore 56. The piston 58 is movable relative to the base member 12 between an initial position P21 and an actuated position P22. The initial position P21 corresponds to the rest position P11 of the operating member 14. The actuated position P22 corresponds to the operated position P12 of the operating member 14.

The piston 58 is operatively coupled to the operating member 14 to move in the cylinder bore 56 in response to a pivotal movement of the operating member 14. The bicycle operating device 10 comprises a piston rod 60 and a coupling pin 62. The piston rod 60 operatively couples the operating member 14 to the piston 58 to move the piston 58 in response to the pivotal movement of the operating member 14. The coupling pin 62 is rotatably attached to the operating member 14 about a coupling rotational axis A3. The coupling pin 62 includes a threaded hole 62A. The piston rod 60 includes an externally threaded part 60A engaged with the threaded hole 62A. The piston rod 60 includes a tool engagement part 60B configured to be engaged with a tool. The tool engagement part 60B includes a hexagonal hole 60B1 configured to be engaged with the tool such as a hexagonal wrench. Rotation of the piston rod 60 changes the rest position P11 of the operating member 14.

The bicycle operating device 10 comprises piston seal members 64 and 66, a piston biasing member 68. The piston seal members 64 are attached to the piston 58. The cylinder bore 56 and the piston 58 define a hydraulic chamber 70. The base member 12 includes a fluid passageway 72 configured to connect the hydraulic chamber 70 to the hydraulic hose HS. Thus, the hydraulic chamber 70 is connected to the bicycle component BC1 with the fluid passageway 72 and the hydraulic hose HS. The piston biasing member 68 is provided in the hydraulic chamber 70 to bias the piston 58 toward the initial position P21. In this embodiment, for example, the piston biasing member 68 includes a coiled spring. The bicycle operating device 10 comprises a stopper 73 and a snap ring 74. The stopper 73 is secured to an end opening 56A of the cylinder bore 56 with the snap ring 74. The stopper 73 receives a biasing force from the piston biasing member 68 to position the piston 58 at the initial position P21.

As seen in FIG. 26, the base member 12 includes a reservoir bore 76 configured to be fluidly connected to the cylinder bore 56. The reservoir chamber 86 is connected to the cylinder bore 56 via connection holes 78. The reservoir bore 76 has a reservoir center axis A4. The reservoir bore 76 extends along the reservoir center axis A4. The reservoir center axis A4 extends along the cylinder center axis A2.

The bicycle operating device 10 comprises a diaphragm 80, a lid 82, and a lid stopper 84. The diaphragm 80 is provided in the reservoir bore 76 and is made of an elastic material such as rubber. The lid 82 is attached to the base member 12 to cover a lid opening of the reservoir bore 76. The lid stopper 84 is secured to the base member 12 to prevent the lid 82 from being unintentionally removed from the lid opening. The reservoir bore 76 and the diaphragm 80 define a reservoir chamber 86. The reservoir chamber 86 is connected to the hydraulic chamber 70 with the connection holes 78.

The base member 12 includes a bleeding port 90 to bleed a hydraulic fluid from the reservoir bore 76. The bleeding port 90 includes a bleeding hole 92, a bleeding plug 94, and a seal ring 96. The bleeding hole 92 extends from the reservoir bore 76 to an outside of the base member 12. The bleeding hole 92 is provided in the tubular part 50. The bleeding plug 94 is detachably attached to the bleeding hole 92. The seal ring 96 is attached to the bleeding plug 94. In this embodiment, the bleeding hole 92 includes a threaded hole. The bleeding plug 94 is threadedly engaged with the threaded hole of the bleeding hole 92. However, the bleeding port 90 can be omitted from the base member 12.

The term "detachably attached", as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably secured," "detachably joined," "detachably connected," "detachably coupled," "detachably mounted," "detachably bonded," "detachably fixed" and their derivatives.

As seen in FIG. 26, the bicycle operating device 10 comprises a securing structure 98 configured to detachably secure the base member 12 to the bicycle handlebar H. The base member 12 is detachably secured to the bar end H1 of the bicycle handlebar H with the securing structure 98. The securing structure 98 includes a holding member 100. The holding member 100 is configured to be mounted within the interior of the bar end H1 of the bicycle handlebar H in the mounting state. The holding member 100 is movably mounted to the mounting portion 55. The holding member 100 is contactable with an inner peripheral surface H1B of the bar end H1 of the bicycle handlebar H.

As seen in FIGS. 5 and 6, the holding member 100 includes an elongated hole 100A. The securing structure 98 includes a guide pin 102 fastened to the mounting portion 55. The guide pin 102 extends through the elongated hole 100A. The holding member 100 is movable along the elongated hole 100A relative to the mounting portion 55.

Figure 27:
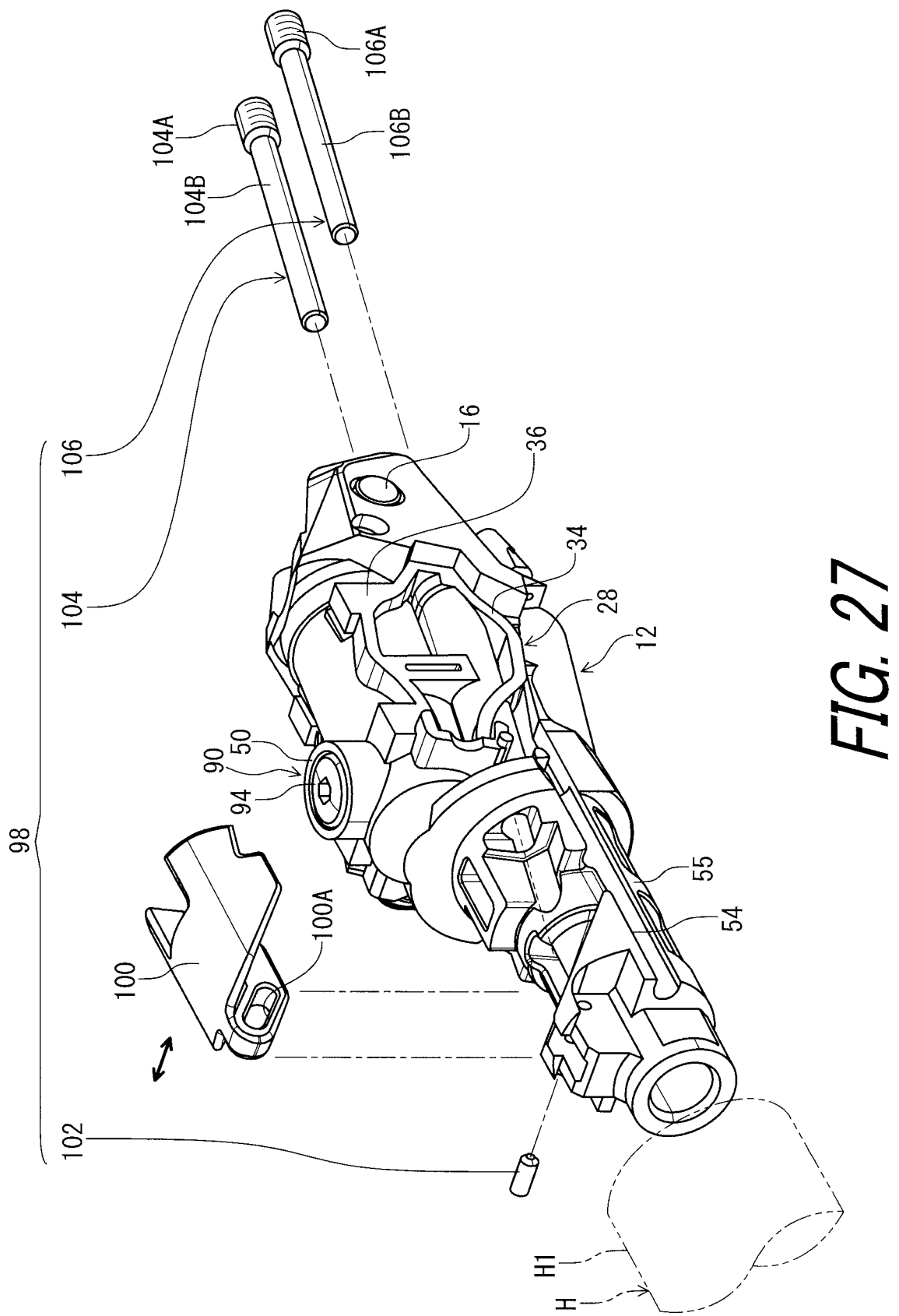
FIG. 27 is an exploded perspective view of the bicycle operating device illustrated in FIG. 1.

As seen in FIG. 27, the securing structure 98 includes a first movable member 104 and a second movable member 106. The first movable member 104 includes a first screw 104A and a first pushing rod 104B. The second movable member 106 includes a second screw 106A and a second pushing rod 106B. The first screw 104A is a separate member from the first pushing rod 104B. The second screw 106A is a separate member from the second pushing rod 106B. However, the first screw 104A can be integrally provided with the first pushing rod 104B as a one-piece unitary member. The second screw 106A can be integrally provided with the second pushing rod 106B as a one-piece unitary member.

Figure 28:
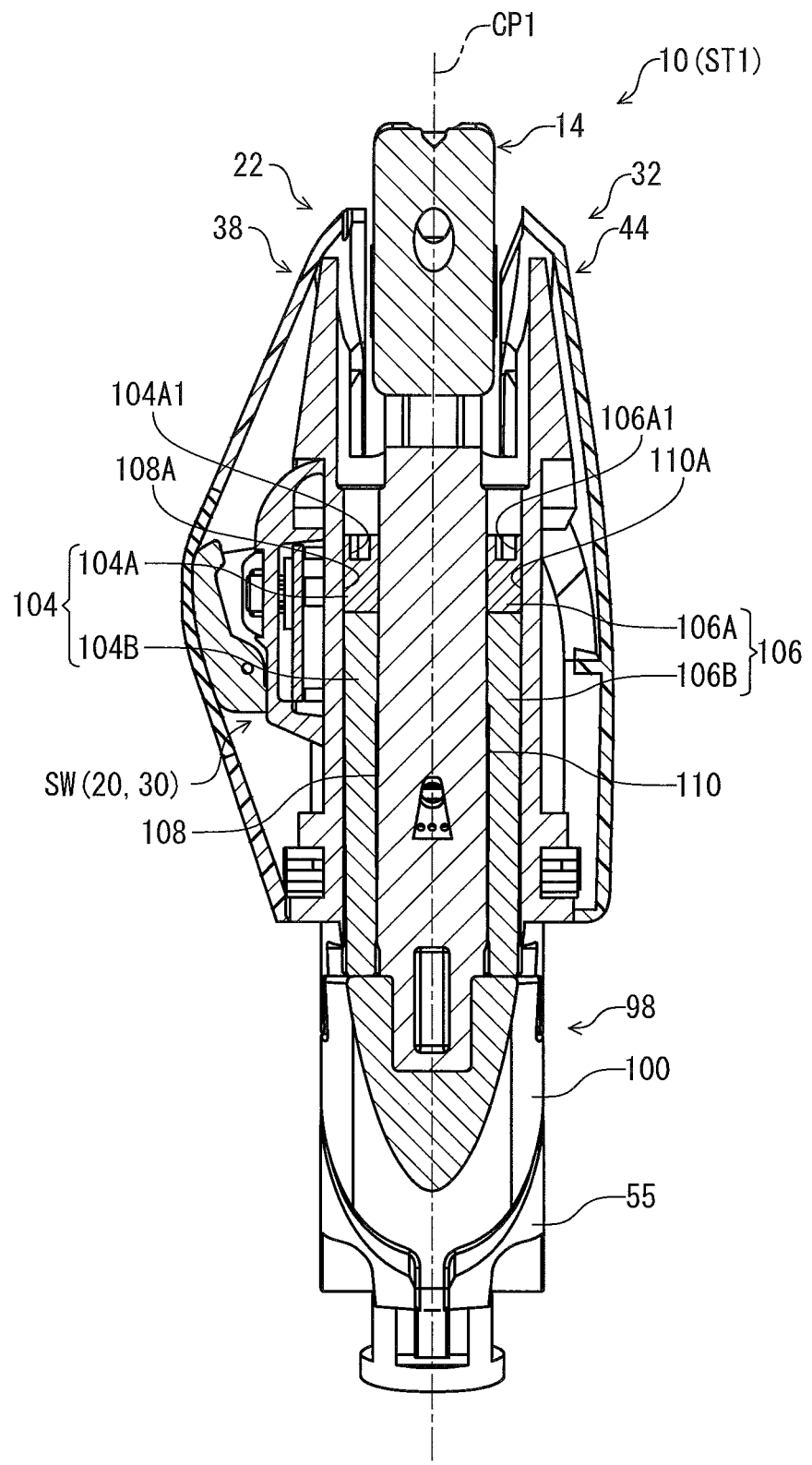
FIG. 28 is a cross-sectional view of the bicycle operating device taken along line XXVIII-XXVIII of FIG. 12 (first state).

As seen in FIG. 28, the base member 12 includes a first guide hole 108 and a second guide hole 110. The first movable member 104 is movably provided in the first guide hole 108. The second movable member 106 is movably provided in the second guide hole 110. The first guide hole 108 includes a first threaded hole 108A threadedly engaged with the first screw 104A. The second guide hole 110 includes a second threaded hole 110A threadedly engaged with the second screw 106A. The first screw 104A includes a first hexagonal hole 104A1. The second screw 106A includes a second hexagonal hole 106A1. As seen in FIG. 28, the first hexagonal hole 104A1 and the second hexagonal hole 106A1 are accessible from an outside of the bicycle operating device 10. Rotation of at least one of the first screw 104A and the second screw 106A changes a position of the holding member 100 relative to the mounting portion 55.

As seen in FIG. 12, the cylinder bore 56 is provided between the first arrangement part 18 and the second arrangement part 28. The reservoir bore 76 is provided between the first arrangement part 18 and the second arrangement part 28. The first guide hole 108 and the second guide hole 110 are provided between the first arrangement part 18 and the second arrangement part 28. The cylinder bore 56 is symmetrical with respect to the base center plane CP1. The reservoir bore 76 is symmetrical with respect to the base center plane CP1. The first guide hole 108 is symmetrical to the second guide hole 110 with respect to the base center plane CP1. The base center plane CP1 is defined to include the cylinder center axis A2 and the reservoir center axis A4. However, the cylinder bore 56 can be asymmetrical with respect to the base center plane CP1. The reservoir bore 76 can be asymmetrical with respect to the base center plane CP1. The first guide hole 108 can be asymmetrical to the second guide hole 110 with respect to the base center plane CP1.

Second Embodiment

A bicycle operating device 210 in accordance with a second embodiment will be described below referring to FIGS. 29 to 32. The bicycle operating device 210 has the same structure and/or configuration as those of the bicycle operating device 10 except for the first operating structure 20 and the second operating structure 30. Thus, elements having substantially the same function as those in the first embodiment will be numbered the same here, and will not be described and/or illustrated again in detail here for the sake of brevity.

Figure 29:
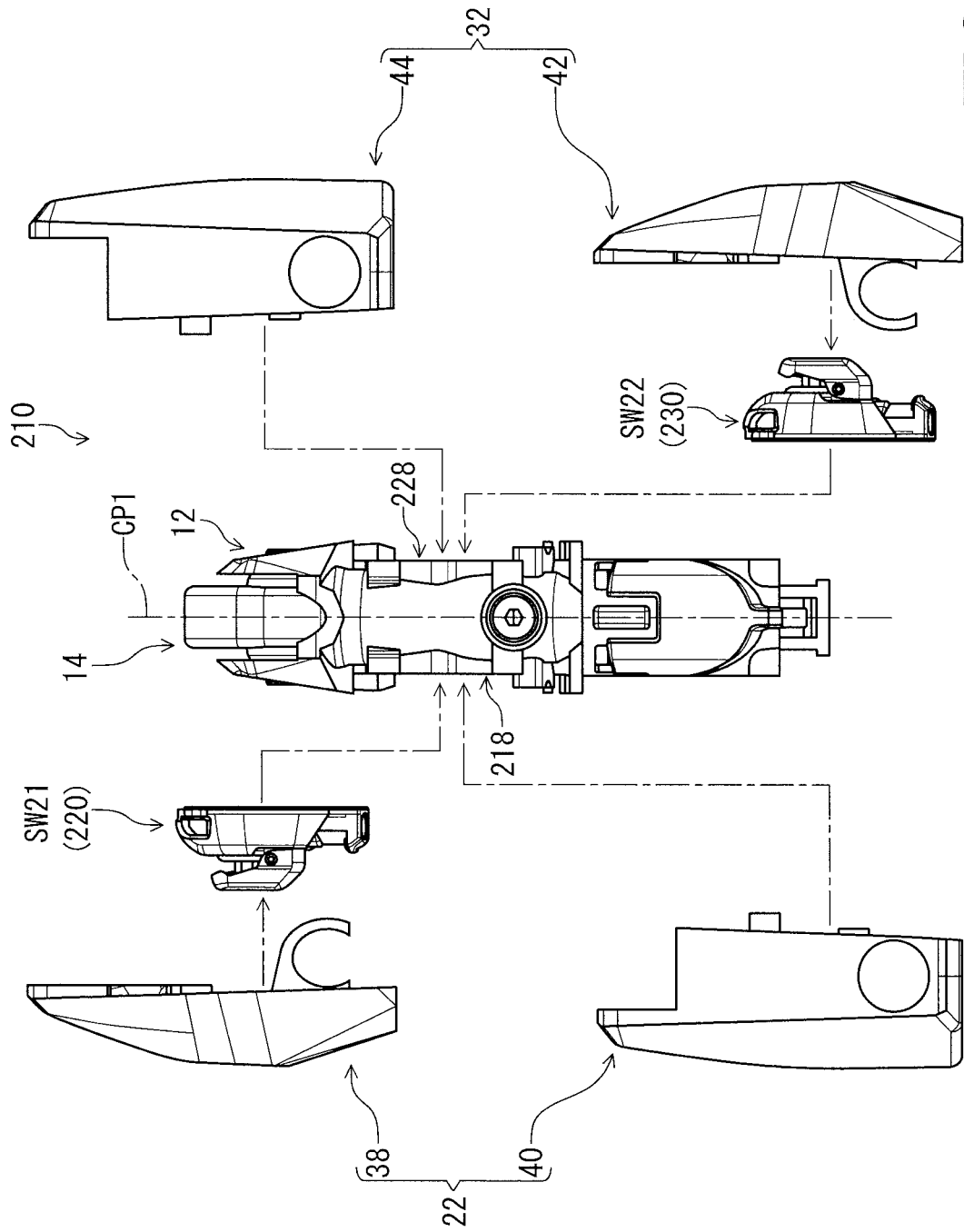
FIG. 29 is an exploded plan view of a bicycle operating device in accordance with a second embodiment (first and second states).
Figure 30:
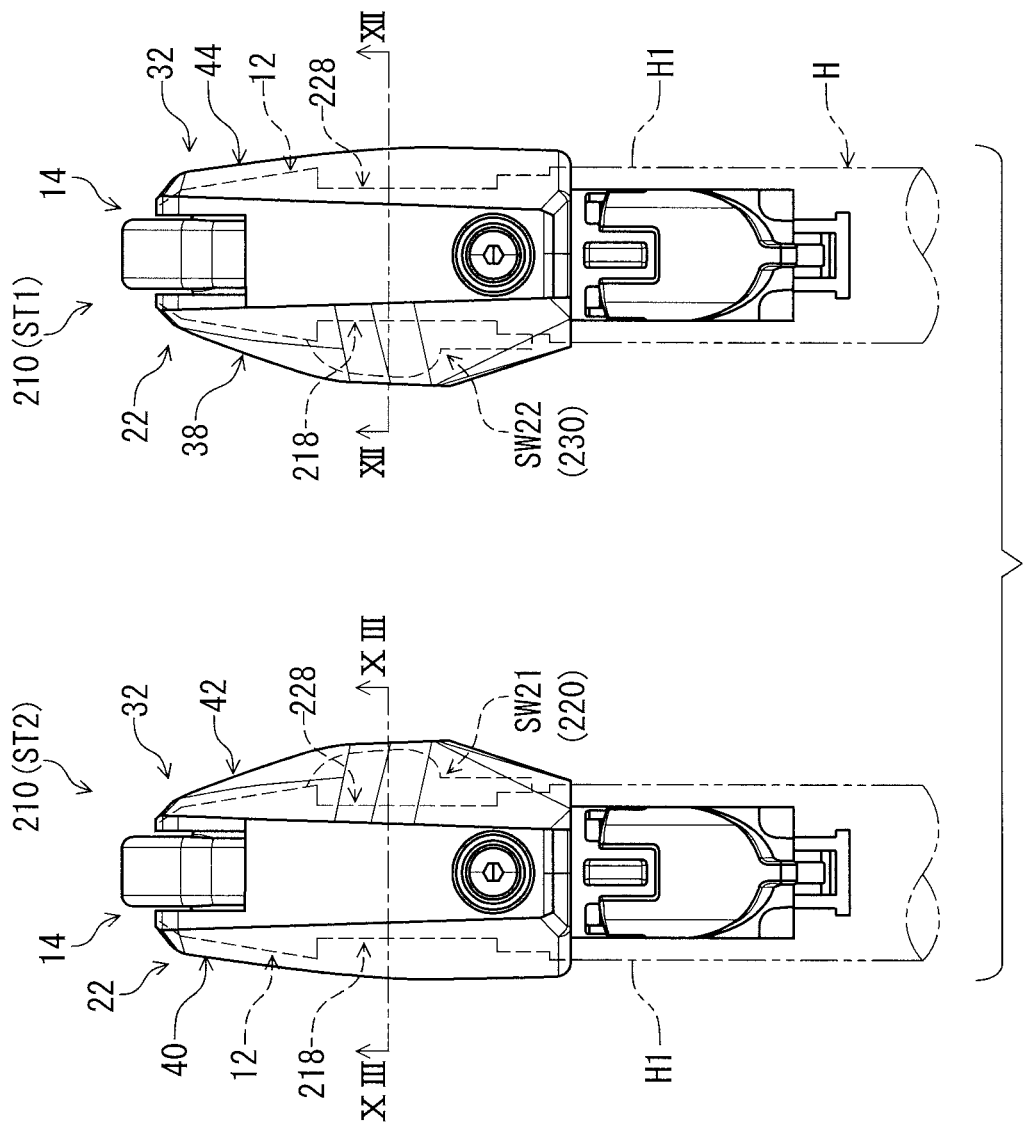
FIG. 30 is a plan view of the bicycle operating device illustrated in FIG. 29 (first and second states).

As seen in FIGS. 29 and 30, the bicycle operating device 210 comprises the base member 12 and the operating member 14. The base member 12 includes a first arrangement part 218 to which at least one of a first operating structure 220 and the first cover structure 22 is arrangeable. The base member 12 includes a second arrangement part 228 to which at least one of a second operating structure 230 and the second cover structure 32 is arrangeable.

The bicycle operating device 210 further comprises the first operating structure 220 and the second operating structure 230. In this embodiment, the first operating structure 220 includes a first electrical switch SW21 arrangeable to the first arrangement part 218. The second operating structure 230 includes a second electrical switch SW22 arrangeable to the second arrangement part 228. The first electrical switch SW21 is arranged to the first arrangement part 218 when the bicycle operating device 210 is used as a right-hand side control device. The second electrical switch SW22 is arranged to the second arrangement part 228 when the bicycle operating device 210 is used as a left-hand side control device.

Figure 31:
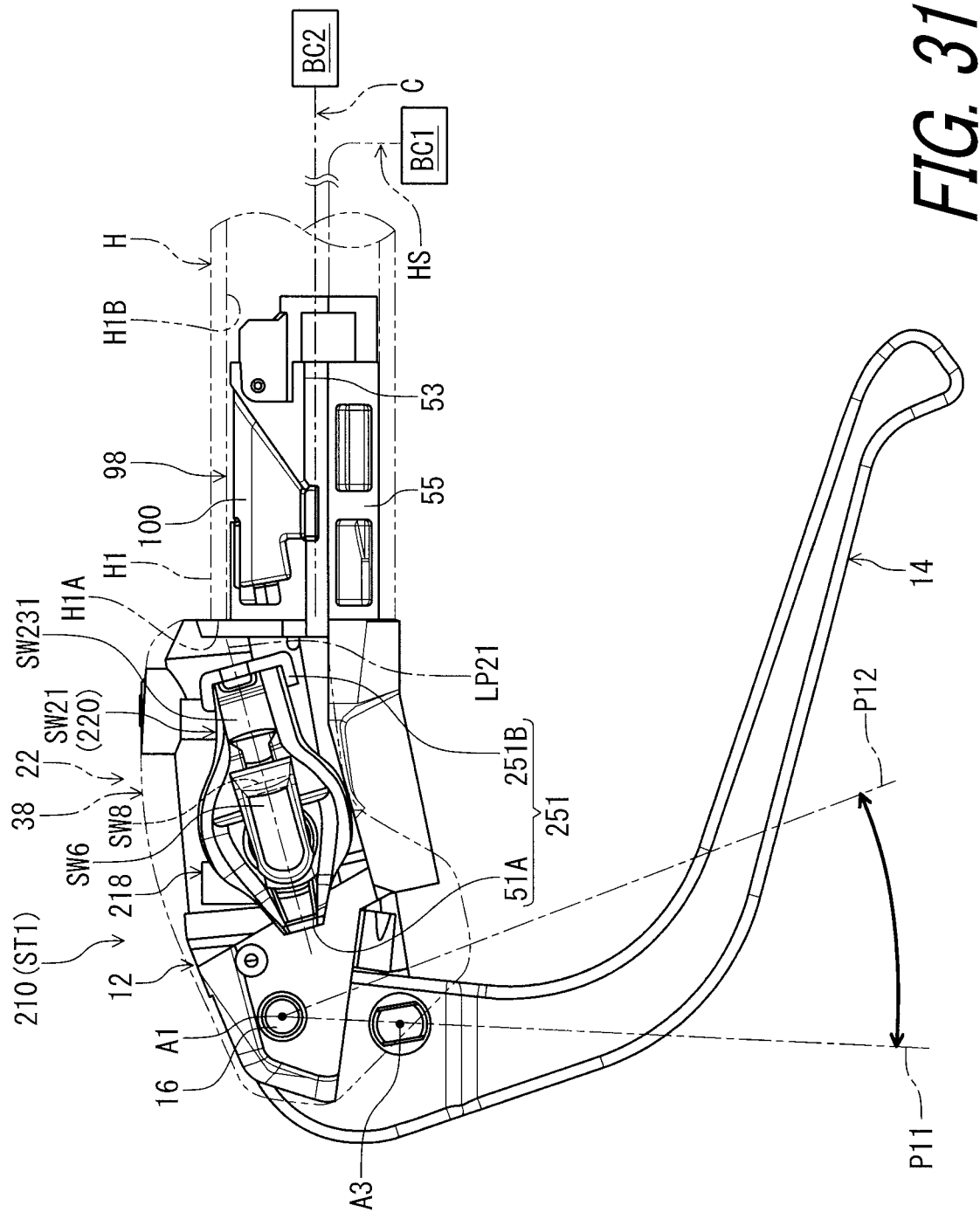
FIG. 31 is a side elevational view of the bicycle operating device illustrated in FIG. 29 (first state).
Figure 32:
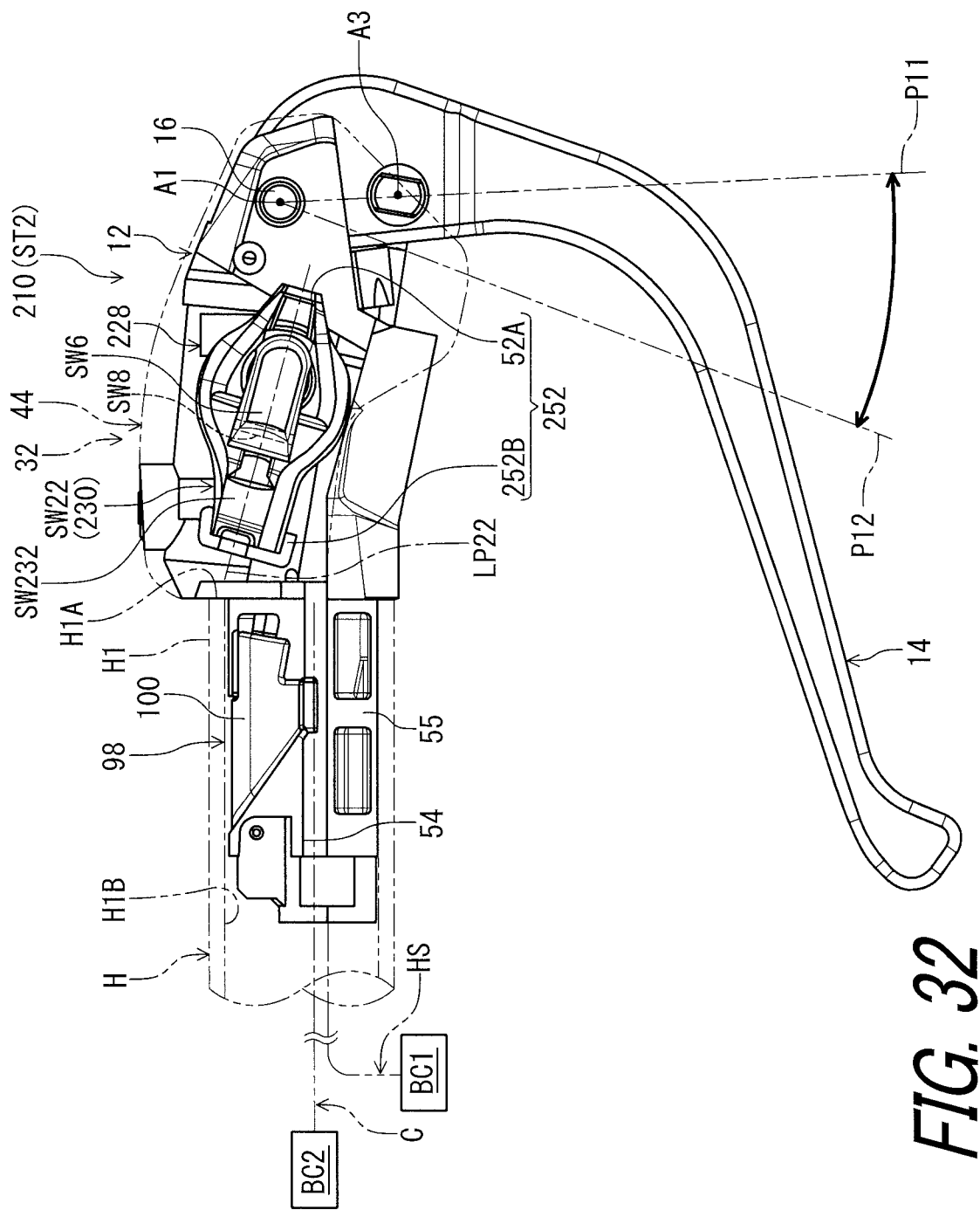
FIG. 32 is a side elevational view of the bicycle operating device illustrated in FIG. 29 (second state).

As seen in FIGS. 31 and 32, the second electrical switch SW22 is different from the first electrical switch SW21. The second electrical switch SW22 is a separate switch from the first electrical switch SW21. The first electrical switch SW21 and the second electrical switch SW22 has substantially the same structure as that of the electrical switch SW. In this embodiment, as seen in FIG. 31, the first electrical switch SW21 includes a first switch housing SW231 instead of the switch housing SW3. As seen in FIG. 32, the second electrical switch SW22 includes a second switch housing SW232 instead of the switch housing SW3. The second switch housing SW232 of the second electrical switch SW22 has a shape different from a shape of the first switch housing SW231 of the first electrical switch SW21. The shapes of the first and second switch housings SW231 and SW232 of the first and second electrical switches SW21 and SW22 are different from the shape of the switch housing SW3 of the electrical switch SW of the first embodiment. As seen in FIG. 31, the first switch housing SW231 has an asymmetrical shape with respect to a first longitudinal center plane LP21 of the first electrical switch SW21. The first longitudinal center plane LP21 is defined to bisect the operating part SW6 and the pin SW8 of the first electrical switch SW21. The first switch housing SW231 has an asymmetrical shape with respect t to the first longitudinal center plane LP21. As seen in FIG. 32, the second switch housing SW232 has an asymmetrical shape with respect to a second longitudinal center plane LP22 of the second electrical switch SW22. The second longitudinal center plane LP22 is defined to bisect the operating part SW6 and the pin SW8 of the second electrical switch SW22. The second switch housing SW232 has an asymmetrical shape with respect to the second longitudinal center plane LP22.

As seen in FIG. 31, the first arrangement part 218 includes a first switch support 251. The first switch support 251 includes the first support recess 51A and a first support rib 251B. An end of the first electrical switch SW21 (an end of the first switch housing SW231) is provided in the first support recess 51A in the first state ST1. The other end of the first electrical switch SW21 (the other end of the first switch housing SW231) is supported by the first support rib 251B in the first state ST1. In this embodiment, the second electrical switch SW22 is not attached to the first switch support 251 since the second electrical switch SW22 has the shape different from the shape of the first electrical switch SW21.

As seen in FIG. 32, the second arrangement part 228 includes a second switch support 252. The second switch support 252 includes the second support recess 52A and a second support rib 252B. An end of the second electrical switch SW22 (an end of the second switch housing SW232) is provided in the second support recess 52A in the second state ST2. The other end of the second electrical switch SW22 (the other end of the second switch housing SW232) is supported by the second support rib 252B in the second state ST2. In this embodiment, the first electrical switch SW21 is not attached to the second switch support 252 since the first electrical switch SW21 has the shape different from the shape of the second electrical switch SW22.

As seen in FIGS. 29 and 30, the first electrical switch SW21 is mirror symmetrical to the second electrical switch SW22 with respect to the base center plane CP1 perpendicular to the pivot axis A1. However, the first electrical switch SW21 can be asymmetrical to the second electrical switch SW22 with respect to the base center plane CP1.

Each of the first electrical switch SW21 and the second electrical switch SW22 has substantially the same structure as that of the electrical switch SW of the bicycle operating device 10 of the first embodiment except for the shapes of the first and second electrical switches SW21 and SW22. Thus, they will not be described in detail here for the sake of brevity.

Third Embodiment

A bicycle operating device 310 in accordance with a third embodiment will be described below referring to FIGS. 33 and 34. The bicycle operating device 310 has the same structure and/or configuration as those of the bicycle operating device 10 except for the first operating structure 20 and the second operating structure 30. Thus, elements having substantially the same function as those in the above embodiments will be numbered the same here, and will not be described and/or illustrated again in detail here for the sake of brevity.

Figure 33:
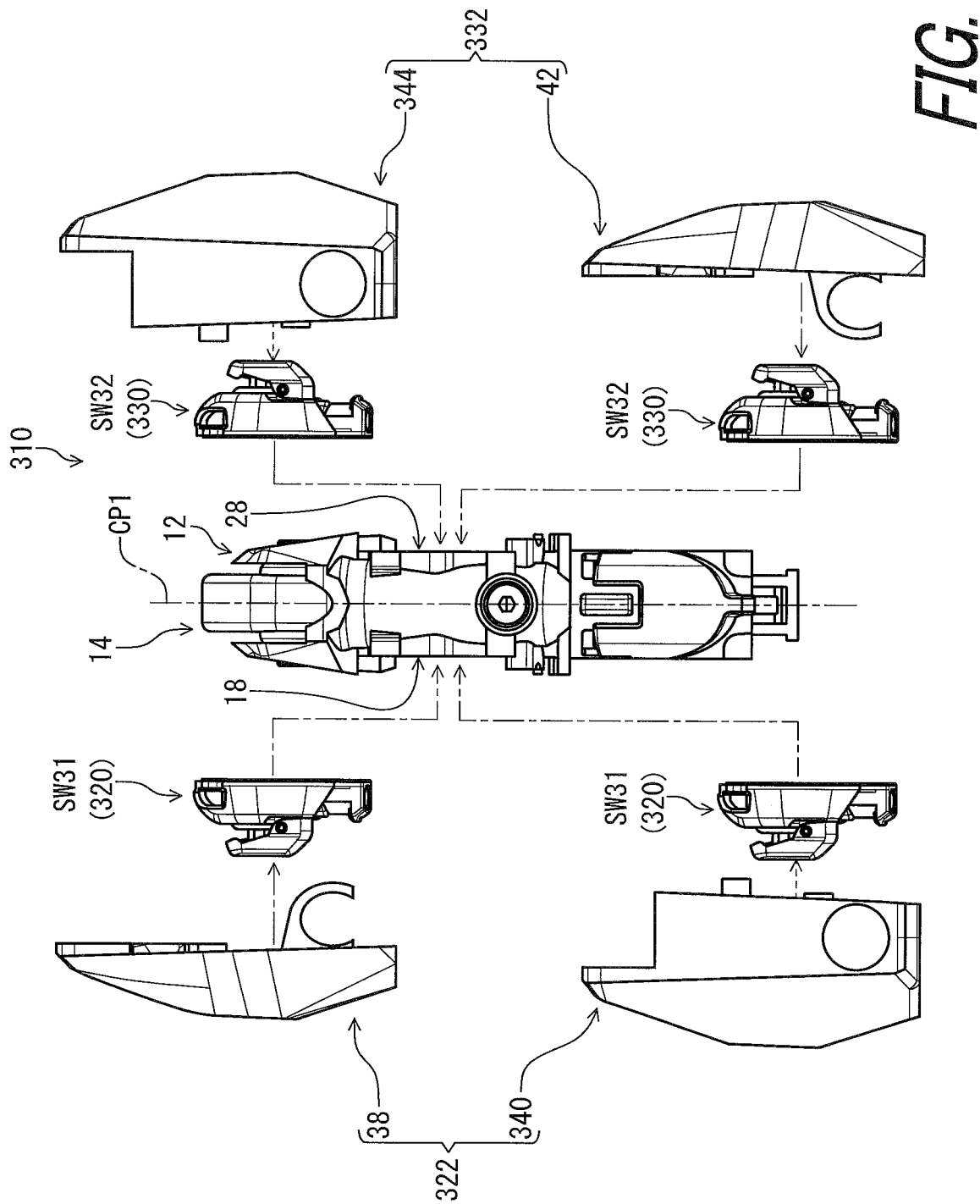
FIG. 33 is an exploded plan view of a bicycle operating device in accordance with a third embodiment (first and second states).
Figure 34:
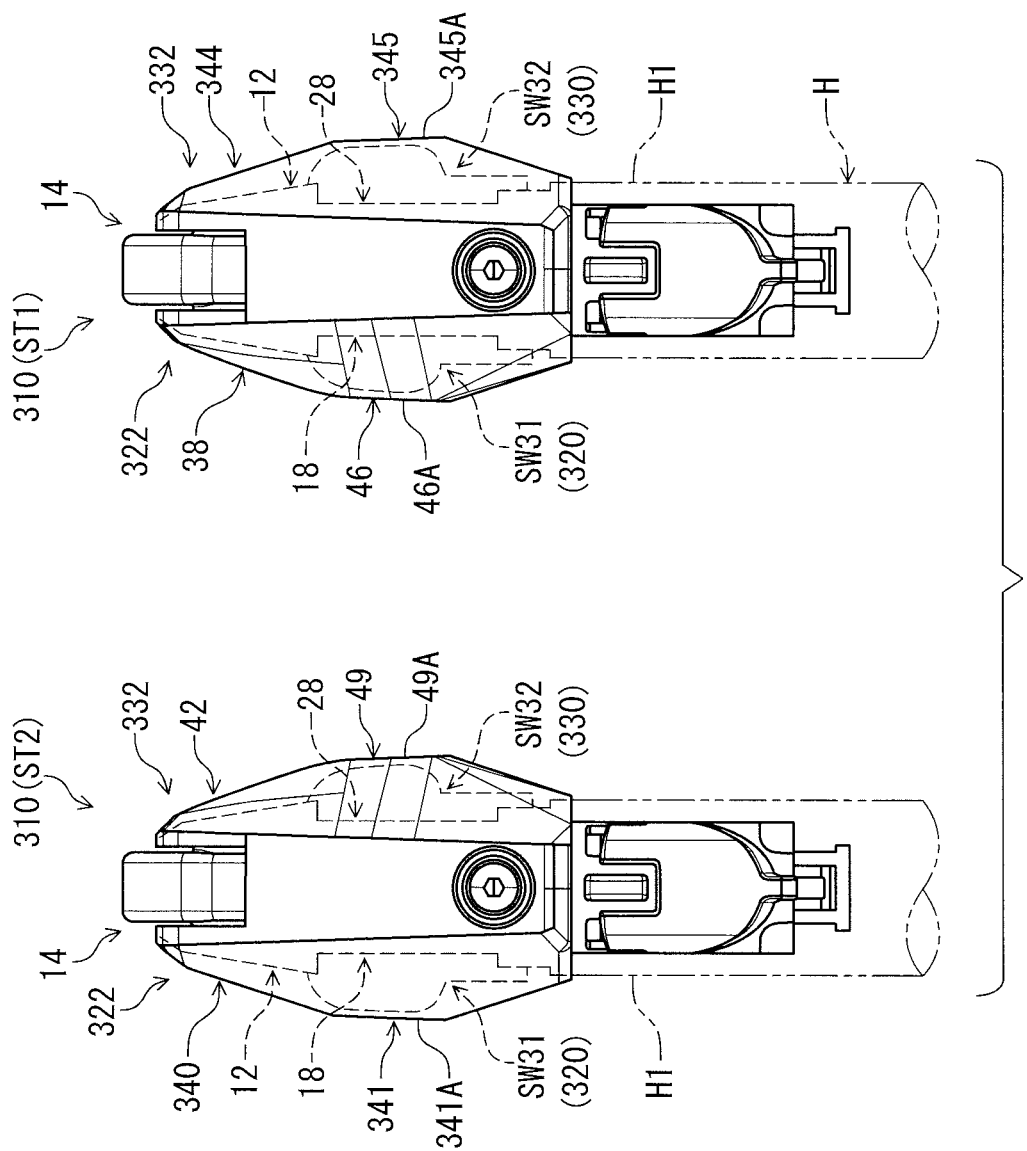
FIG. 34 is a plan view of the bicycle operating device illustrated in FIG. 33 (first and second states).

As seen in FIGS. 33 and 34, the bicycle operating device 310 comprises the base member 12 and the operating member 14. The base member 12 includes the first arrangement part 18 to which at least one of a first operating structure 320 and a first cover structure 322 is arrangeable. The base member 12 includes the second arrangement part 28 to which at least one of a second operating structure 330 and a second cover structure 332 is arrangeable.

The bicycle operating device 310 further comprises the first operating structure 320 and the second operating structure 330. In this embodiment, the first operating structure 320 includes a first electrical switch SW31 arrangeable to the first arrangement part 18. The second operating structure 330 includes a second electrical switch SW32 arrangeable to the second arrangement part 28. The first electrical switch SW31 and the second electrical switch SW32 are respectively arranged to the first arrangement part 18 and the second arrangement part 28 when the bicycle operating device 310 is used as each of the right-hand side control device and the left-hand side control device.

As seen in FIGS. 33 and 34, the second electrical switch SW32 is a separate switch from the first electrical switch SW31. The switch housing SW3 of the second electrical switch SW32 has the same shape as the shape of the switch housing SW3 of the first electrical switch SW31. The shapes of the first and second electrical switches SW31 and SW32 is the same as the shape of the switch housing SW3 of the electrical switch SW of the first embodiment.

The bicycle operating device 310 further comprises the first cover structure 322. The first cover structure 322 includes at least one of the first cover 38 and a second cover 340. In this embodiment, the first cover structure 322 includes the first cover 38 and the second cover 340. The second cover 340 is selectively arrangeable to the first arrangement part 18. The second cover 340 has a shape different from a shape of the first cover 38. The second cover 340 includes a third access portion 341 from which the first operating structure 320 is operated in the second state ST2. The third access portion 341 includes a third elastic member 341A contactable with the first operating structure 320 in the second state ST2.

The bicycle operating device 310 further comprises the second cover structure 332. The second cover structure 332 includes at least one of the third cover 42 and a fourth cover 344. In this embodiment, the second cover structure 332 includes the third cover 42 and the fourth cover 344. The fourth cover 344 is selectively arrangeable to the second arrangement part 28. The fourth cover 344 has a shape different from a shape of the third cover 42. The fourth cover 344 includes a second access portion 345 from which the second operating structure 330 is operated in the second state ST2. The second access portion 345 includes a second elastic member 345A contactable with the second operating structure 330 in the second state ST2.

The second cover 340 has substantially the same structure as that of the second cover 40 of the first embodiment. The fourth cover 344 has substantially the same structure as that of the fourth cover 44 of the first embodiment. Thus, they will not be described in detail here for the sake of brevity.

Each of the first electrical switch SW31 and the second electrical switch SW32 has the same structure as that of the electrical switch SW of the bicycle operating device 10 of the first embodiment. Thus, they will not be described in detail here for the sake of brevity.

Fourth Embodiment

A bicycle operating device 410 in accordance with a fourth embodiment will be described below referring to FIGS. 35 and 36. The bicycle operating device 410 has the same structure and/or configuration as those of the bicycle operating device 10 except for a wireless communicator WC. Thus, elements having substantially the same function as those in the first embodiment will be numbered the same here, and will not be described and/or illustrated again in detail here for the sake of brevity.

Figure 35:
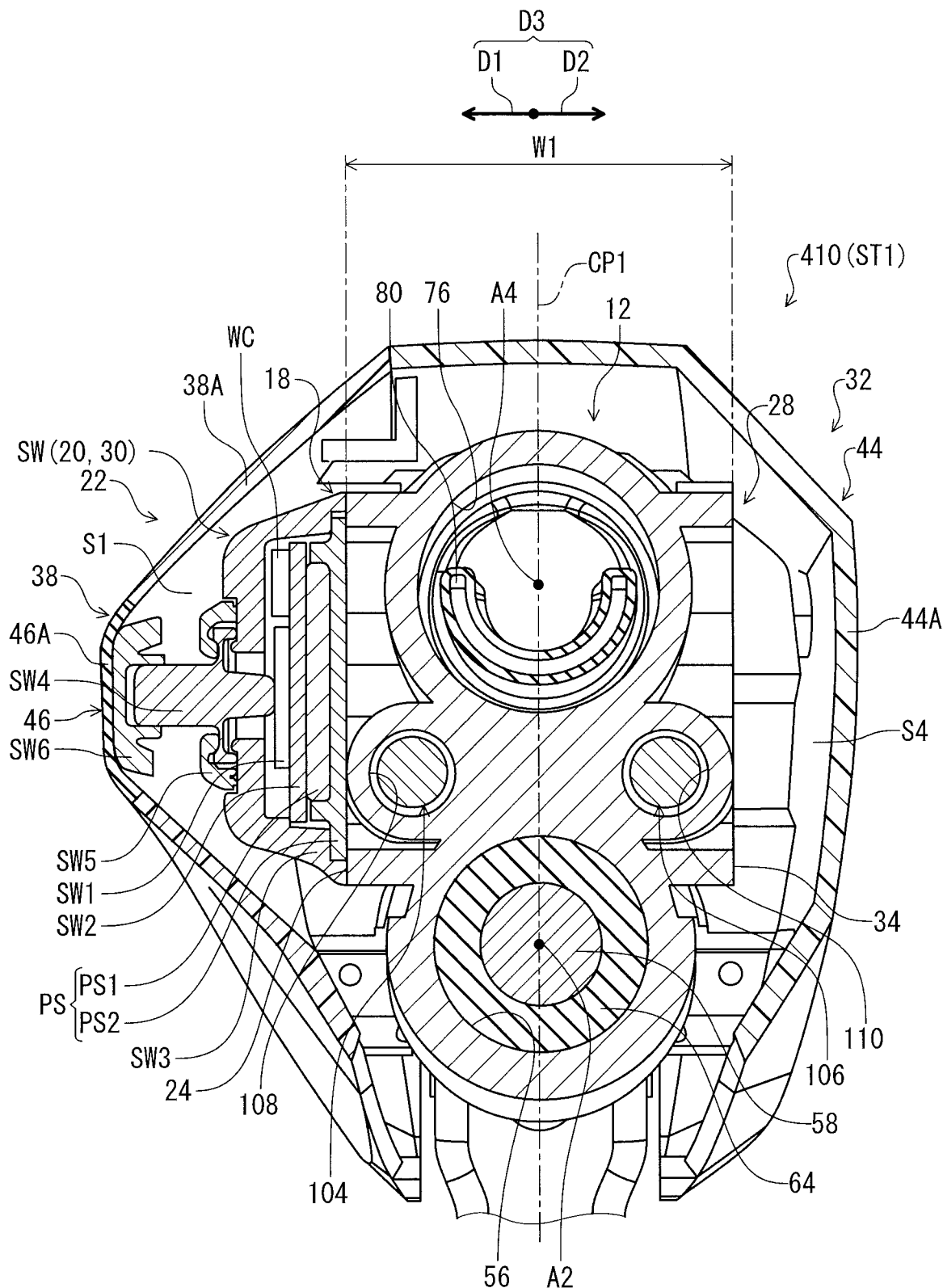
FIG. 35 is a cross-sectional view of a bicycle operating device in accordance with a fourth embodiment (first state).

As seen in FIG. 35, the bicycle operating device 410 further comprises a wireless communicator WC. At least one of the first operating structure 20 and the second operating structure 30 are electrically connected to the wireless communicator WC to transmit a wireless signal based on a user input with respect to the at least one of the first operating structure 20 and the second operating structure 30. In this embodiment, the bicycle operating device 410 comprises the electrical switch SW provided as the first operating structure 20 and the second operating structure 30 which are identical to each other. The electrical switch SW is electrically connected to the wireless communicator WC. The wireless communicator WC is provided in the switch housing SW3 and is electrically mounted on the substrate SW2.

Figure 36:
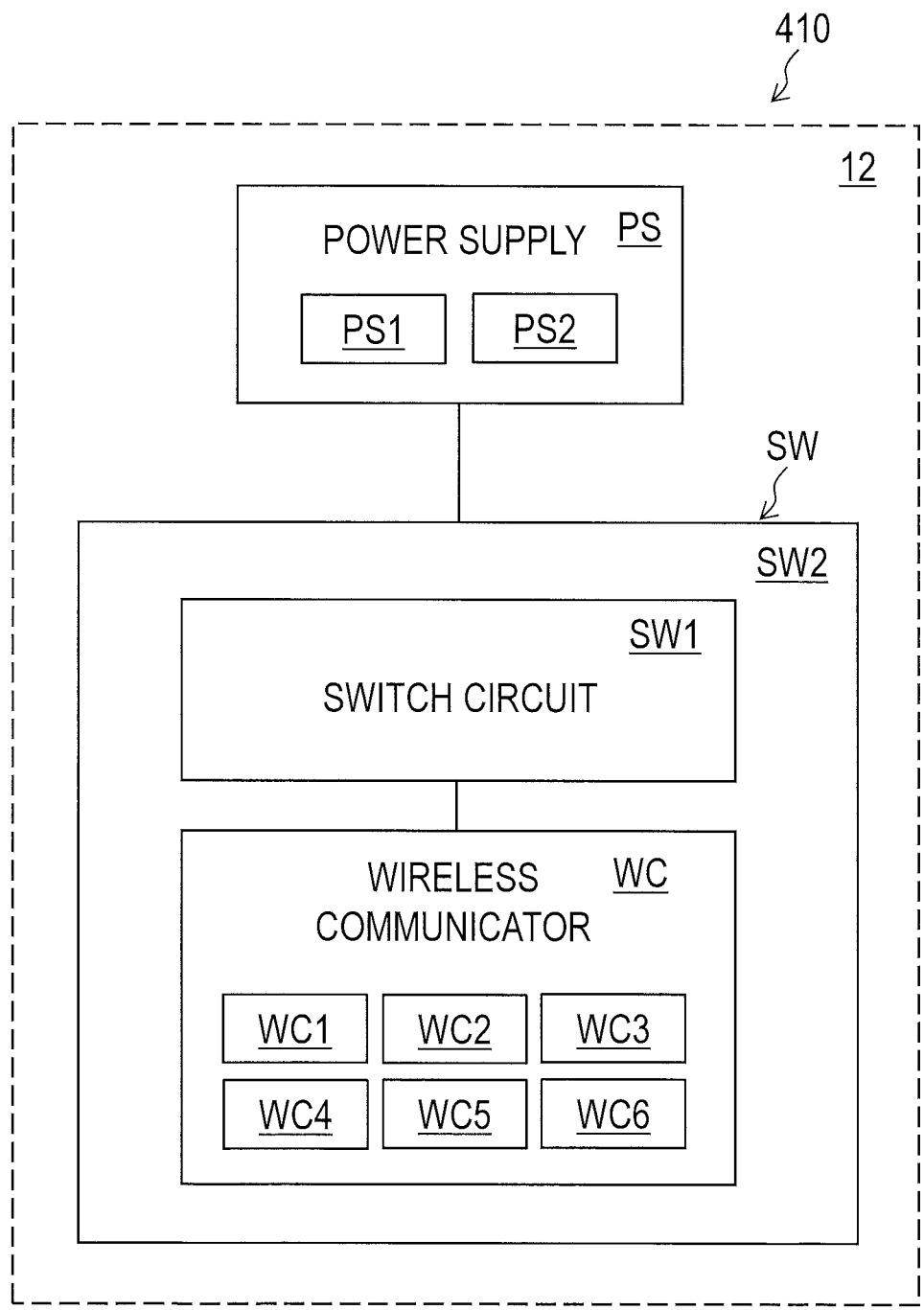
FIG. 36 is a schematic block diagram of the bicycle operating device illustrated in FIG. 35.

In this embodiment, as seen in FIG. 36, the wireless communicator WC includes a processor WC1, a memory WC2, a signal generating circuit WC3, a signal transmitting circuit WC4, a signal receiving circuit WC5, and an antenna WC6. The processor WC1, the memory WC2, the signal generating circuit WC3, the signal transmitting circuit WC4, the signal receiving circuit WC5, and the antenna WC6 are electrically mounted on the substrate SW2 and are electrically connected to each other with the substrate SW2. Thus, the wireless communicator WC can also be referred to as a wireless communication circuit or circuitry WC in the present application.

The processor WC1 includes a central processing unit (CPU) and a memory controller. The memory WC2 is connected to the processor WC1. The memory WC2 includes a read only memory (ROM) and a random-access memory (RAM). The ROM includes a non-transitory computer-readable storage medium. The RAM includes a transitory computer-readable storage medium. The memory WC2 includes storage areas each having an address in the ROM and the RAM. The processor WC1 controls the memory WC2 to store data in the storage areas of the memory WC2 and reads data from the storage areas of the memory WC2. The memory WC2 (e.g., the ROM) stores a program. The program is read into the processor WC1, and thereby performs functions of the wireless communicator WC (e.g., at least part of functions of the signal generating circuit WC3 and the signal transmitting circuit WC4).

The signal generating circuit WC3 generates wireless signals based on the input operation received by the electrical switch SW. The signal generating circuit WC3 superimposes digital signals on carrier wave using a predetermined wireless communication protocol to generate the wireless signals. The signal transmitting circuit WC4 transmits the wireless signal with the antenna WC6 in response to the input operation received by the electrical switch SW. In this embodiment, the signal generating circuit WC3 can encrypt control information (e.g., shift information) to generate encrypted wireless signals. The signal generating circuit WC3 encrypts digital signals stored in the memory WC2 using a cryptographic key. The signal transmitting circuit WC4 transmits the encrypted wireless signals. Thus, the wireless communicator WC wirelessly transmits the wireless signal to upshift or downshift the additional bicycle component BC2 when the electrical switch SW is closed to be activated by the input operation.

Further, the signal receiving circuit WC5 receives a wireless signal from the additional bicycle component BC2 with the antenna WC6. In this embodiment, the signal receiving circuit WC5 decodes the wireless signal to recognize information wirelessly transmitted from the additional bicycle component BC2. The signal receiving circuit WC5 may decrypt the encrypted wireless signal using the cryptographic key. Namely, the wireless communicator WC is configured to transmit a wireless signal to control other electrical bicycle components and to receive a wireless signal to recognize information from other electrical bicycle components. In other words, the wireless communicator WC is provided as a wireless transmitter and a wireless receiver. The other electrical bicycle components can include the electric suspension and the electric seatpost in addition to the additional bicycle component BC2. In this embodiment, the wireless communicator WC is integrally provided as a single module or unit. However, the wireless communicator WC can be constituted of a wireless transmitter and a wireless receiver which are provided as separate modules or units arranged at different positions from each other. The signal receiving circuit WC5 can be omitted from the wireless communicator WC. The wireless communicator WC can include an indicator such as a light emitting diode (LED) to indicate a state of the wireless communicator WC.

As seen in FIGS. 35 and 36, the bicycle operating device 410 preferably comprises a power supply PS electrically connected to the wireless communicator WC to supply electric energy to the wireless communicator WC. In this embodiment, the power supply PS is electrically connected to the wireless communicator WC to supply electric energy (e.g., a power source voltage) to the wireless communicator WC. The power supply PS supplies the electric energy to other elements through the wireless communicator WC. However, the power supply PS can be electrically connected to the other elements without the wireless communicator WC.

In this embodiment, the power supply PS includes a battery PS1 and a battery holder PS2. The battery PS1 is detachably mounted to the battery holder PS2. The battery holder PS2 is electrically connected to the substrate SW2. The battery holder PS2 is provided in the switch housing SW3 instead of the spacer SW7. Examples of the battery PS1 include a primary battery such as a lithium manganese dioxide battery, and a secondary battery such as a lithium-ion secondary battery. In this embodiment, the battery PS1 is a primary button battery. However, the power supply PS can include an electric-energy generation element configured to generate the electric energy using pressure and/or vibration instead of or in addition to the battery PS1.

It will be apparent to those skilled in the bicycle field from the present disclosure that the above embodiments can at least partly combined with each other if needed and/or desired. For example, the wireless communicator WC of the fourth embodiment can be applied to the bicycle operating devices 10, 210, and 310 of the first to third embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member configured to be mounted to a bicycle handlebar;
   an operating member movably coupled to the base member, the operating member being pivotally coupled to the base member about a pivot axis; and
   an electrical switch,
   the base member including
      a first arrangement part to which the electrical switch is arrangeable, and
      a second arrangement part to which the electrical switch is arrangeable,
   the base member having
      a maximum axial width defined in an axial direction of the pivot axis, and
      a base center plane defined to bisect the maximum axial width and perpendicular to the pivot axis,
   the electrical switch being configured to be selectively provided on either one of the first arrangement part and the second arrangement part,
   the first arrangement part including:
      a first support recess configured to receive a first portion of the electrical switch when the electrical switch is provided at the first arrangement part, and/or
      a first support rib configured to support a second portion of the electrical switch when the electrical switch is provided at the first arrangement part,
   the second arrangement part including:
      a second support recess configured to receive the first portion of the electrical switch when the electrical switch is provided at the second arrangement part, and/or
      a second support rib configured to support the second portion of the electrical switch when the electrical switch is provided at the second arrangement part, and
   the first arrangement part and the second arrangement part being provided on opposite sides of the base center plane.

2. The bicycle operating device according to claim 1, wherein
   the first arrangement part at least partly faces in a first direction, and
   the second arrangement part at least partly faces in a second direction opposite to the first direction.

3. The bicycle operating device according to claim 2, wherein
   the first direction and the second direction are parallel to the pivot axis.

4. The bicycle operating device according to claim 1, wherein
   the first arrangement part includes a first arrangement surface contactable with the electrical switch, and
   the second arrangement part includes a second arrangement surface contactable with the electrical switch.

5. The bicycle operating device according to claim 4, wherein
   the first arrangement surface faces in a first direction, and
   the second arrangement surface faces in a second direction opposite to the first direction.

6. The bicycle operating device according to claim 1, further comprising:
   a first cover structure arrangeable to the first arrangement part to cover the electrical switch when the electrical switch is provided at the first arrangement part; and
   a second cover structure arrangeable to the second arrangement part to cover the electrical switch when the electrical switch is provided at the second arrangement part.

7. The bicycle operating device according to claim 6, wherein
   the first arrangement part includes a first attachment portion to which the first cover structure is attachable.

8. The bicycle operating device according to claim 6, wherein
   the second arrangement part includes a second attachment portion to which the second cover structure is attachable.

9. The bicycle operating device according to claim 1, further comprising
   an additional electrical switch arrangeable to at least one of the first arrangement part and the second arrangement part.

10. The bicycle operating device according to claim 1, further comprising
    a wireless communicator, wherein
    the electrical switch is configured to be electrically connected to the wireless communicator to transmit a wireless signal based on a user input with respect to the electrical switch.

11. The bicycle operating device according to claim 6, wherein
    the first cover structure includes at least one of
       a first cover selectively arrangeable to the first arrangement part, and
       a second cover selectively arrangeable to the first arrangement part, the second cover having a shape different from a shape of the first cover.

12. The bicycle operating device according to claim 11, wherein
    the first cover includes a first facing part spaced apart from the first arrangement part to define a first space in which the electrical switch is arrangeable in a first state where the first cover is arranged to the first arrangement part.

13. The bicycle operating device according to claim 12, wherein
    the first cover includes a first access portion from which the electrical switch is operated in the first state.

14. The bicycle operating device according to claim 13, wherein
    the first access portion includes a first elastic member contactable with the electrical switch in the first state.

15. The bicycle operating device according to claim 6, wherein
    the second cover structure includes at least one of
       a third cover selectively arrangeable to the second arrangement part, and
       a fourth cover selectively arrangeable to the second arrangement part, the fourth cover having a shape different from a shape of the third cover.

16. The bicycle operating device according to claim 15, wherein the third cover includes a second facing part spaced apart from the second arrangement part to define a second space in which the electrical switch is arrangeable in a second state where the third cover is arranged to the second arrangement part.

17. The bicycle operating device according to claim 16, wherein
the third cover includes a second access portion from which the electrical switch is operated in the second state.

18. The bicycle operating device according to claim 17, wherein
the second access portion includes a second elastic member contactable with the electrical switch in the second state.

19. The bicycle operating device according to claim 1, wherein
the base member includes a bar-end contact surface configured to contact an end surface of a bar end of the bicycle handlebar in a mounting state where the base member is mounted to the bicycle handlebar.

20. The bicycle operating device according to claim 1, wherein
the base member includes a cylinder bore provided between the first arrangement part and the second arrangement part.

21. The bicycle operating device according to claim 20, wherein
the base member includes a reservoir bore configured to be fluidly connected to the cylinder bore, and
the reservoir bore is provided between the first arrangement part and the second arrangement part.

22. The bicycle operating device according to claim 1, wherein
the electrical switch has a symmetrical shape with respect to a longitudinal center plane of the electrical switch.

23. The bicycle operating device according to claim 1, wherein
the first arrangement part is symmetrical to the second arrangement part with respect to the base center plane.

24. The bicycle operating device according to claim 1, wherein
the operating member is symmetrical with respect to the base center plane.

25. The bicycle operating device according to claim 1, wherein
the base member includes a first cable guide groove and a second cable guide groove, and
the base center plane is provided between the first cable guide groove and the second cable guide groove.

26. The bicycle operating device according to claim 4, wherein
the first arrangement surface is offset from the pivot axis as viewed along the pivot axis, and
the second arrangement surface is offset from the pivot axis as viewed along the pivot axis.

* * * * *